US012623421B2

(12) United States Patent      (10) Patent No.:   US 12,623,421 B2

De Col et al.      (45) Date of Patent:    May 12, 2026

(54) METHOD FOR ARRANGING ELONGATED ELEMENTS TO BE USED IN A PROCESS FOR BUILDING TYRES FOR VEHICLE WHEELS AND PLANT FOR BUILDING TYRES FOR VEHICLE WHEELS

(71) Applicant: PIRELLI TYRE S.P.A., Milan (IT)

(72) Inventors: Christian De Col, Milan (IT); Andrea Anfossi, Milan (IT); Gianni Enrico Portinari, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 104 days.

(21) Appl. No.: 18/258,685

(22) PCT Filed: Dec. 28, 2021

(86) PCT No.: PCT/IB2021/062387

§ 371 (c)(1),
(2) Date: Jun. 21, 2023

(87) PCT Pub. No.: WO2022/144770

PCT Pub. Date: Jul. 7, 2022

(65) Prior Publication Data

US 2024/0066820 A1     Feb. 29, 2024

(30) Foreign Application Priority Data

Dec. 29, 2020    (IT) ........................ 102020000032561

(51) Int. Cl.
    *B29D 30/00*       (2006.01)
    *B29D 30/30*       (2006.01)

(52) U.S. Cl.
    CPC ......... *B29D 30/0016* (2013.01); *B29D 30/30* (2013.01); *B29D 2030/0038* (2013.01)

(58) Field of Classification Search
    CPC ................ B29D 30/0016; B29D 30/16; B29D 30/1621; B29D 30/1628; B29D 30/30;
            (Continued)

(56) References Cited

U.S. PATENT DOCUMENTS 3,623,677 A    11/1971   Appleby et al.
4,116,401 A     9/1978   Evert et al.
             (Continued)

FOREIGN PATENT DOCUMENTS

CA         2663546 A1     3/2008
CN     104870177 A     8/2015
             (Continued)

OTHER PUBLICATIONS

Saudi Arabian Examination Report for SA Application No. 523441366 filed on Dec. 28, 2021 on behalf of Pirelli Tyre S.P.A. Mail Date: Dec. 28, 2023 (English + Original) 10 pages.

(Continued)

*Primary Examiner* — Sedef E Paquette

(74) *Attorney, Agent, or Firm* — Steinfl + Bruno LLP

(57) ABSTRACT

A method for arranging elongated elements to be used in a process for building tyres for vehicle wheels, including: winding in parallel a first elongated element and a second elongated element of a first type respectively on a first winding support and a second winding support coupled and rotatable about a first rotation axis; winding in parallel a third elongated element and a fourth elongated element of a second type respectively on a third winding support and a fourth winding support coupled and rotatable about a second rotation axis, where the elongated elements of the second type are different from the elongated elements of the first type; decoupling the second winding support from the first winding support and the fourth winding support from the third winding support; and coupling the second winding (Continued)

support with the third winding support and the fourth winding support with the first winding support.

18 Claims, 10 Drawing Sheets

(58) Field of Classification Search
  CPC ............ B29D 30/3021; B29D 30/3028; B29D 2030/0038; B65H 18/106; B65H 2801/93
  USPC ......................................................... 156/123
  See application file for complete search history.

(56) References Cited

U.S. PATENT DOCUMENTS

| | | | |
|---|---|---|---|
| 5,775,630 A | 7/1998 | Hogberg et al. | |
| 2008/0036120 A1 | 2/2008 | Lacagnina | |
| 2011/0168322 A1* | 7/2011 | Mariani ............. | B29D 30/2607 156/111 |
| 2014/0034220 A1 | 2/2014 | Mancini et al. | |
| 2015/0283771 A1 | 10/2015 | Fabbretti et al. | |
| 2015/0343730 A1 | 12/2015 | Marchini et al. | |
| 2021/0180219 A1 | 6/2021 | Cornille et al. | |
| 2024/0034014 A1 | 2/2024 | De Col et al. | |
| 2024/0051250 A1 | 2/2024 | De Col et al. | |

FOREIGN PATENT DOCUMENTS

| | | |
|---|---|---|
| CN | 107107502 A | 8/2017 |
| CN | 107107505 A | 8/2017 |
| CN | 107214987 A | 9/2017 |
| CN | 108996297 A | 12/2018 |
| CN | 109296704 A | 2/2019 |
| CN | 213568937 U | 6/2021 |
| EP | 001 1236669 A1 | 9/2002 |
| EP | 1629964 A2 | 3/2006 |
| JP | H05293912 A | 11/1993 |
| JP | H10296875 A | 11/1998 |
| JP | 2009023508 A | 2/2009 |
| WO | 2011/101738 A1 | 8/2011 |
| WO | 2012/017399 A1 | 2/2012 |
| WO | 2012/085776 A1 | 6/2012 |
| WO | 2014/011033 A1 | 1/2014 |
| WO | 2015/097578 A1 | 7/2015 |
| WO | 2015/097579 A1 | 7/2015 |
| WO | 2016/103077 A1 | 6/2016 |
| WO | 2022/144766 A1 | 7/2022 |
| WO | 2022/144768 A1 | 7/2022 |
| WO | 2022/144770 A1 | 7/2022 |

OTHER PUBLICATIONS

First Chinese Office Action for Chinese Application No. 202180088105.5 filed on Dec. 28, 2021 on behalf of Pirelli Tyre S.P.A. Mail Date: Oct. 26, 2023 13 pages (English + Original).

Non-Final Office Action for U.S. Appl. No. 18/258,192 filed on Jun. 16, 2023 on behalf of Pirelli Tyre S.P.A. Mail Date: Nov. 4, 2024 15 pages.

Restriction Requirement for U.S. Appl. No. 18/258,192 filed on Jun. 16, 2023 on behalf of Pirelli Tyre S.P.A. Mail Date: Jul. 26, 2024 8 pages.

Saudi Arabian Examination Report for Application No. 523441366 filed on May 24, 2022 on behalf of Pirelli Tyre S.P.A. Mail Date: Mar. 8, 2025 10 pages (English + Original).

International Search Report and Written Opinion for International Application No. PCT/IB2021/062379 filed on Dec. 28, 2021 on behalf of Pirelli Tyre S.P.A. Mail Date: Apr. 22, 2022 14 pages.

International Search Report and Written Opinion for International Application No. PCT/IB2021/062382 filed on Dec. 28, 2021 on behalf of Pirelli Tyre S.P.A. Mail Date: Apr. 22, 2022 13 pages.

International Search Report and Written Opinion for International Application No. PCT/IB2021/062387 filed on Dec. 28, 2021 on behalf of Pirelli Tyre S.P.A. Mail Date: May 3, 2022 13 pages.

Final Office Action for U.S. Appl. No. 18/258,192 filed on Jun. 16, 2023 for Pirelli Tyre S.P.A. Mail Date: Mar. 31, 2025 10 pages.

Non-Final Office Action for U.S. Appl. No. 18/258,192 filed on Jun. 16, 2023 on behalf of Pirelli Tyre S.P.A. Mail Date: Jun. 24, 2025 14 pages.

Non-Final Office Action for U.S. Appl. No. 18/258,685, filed Jun. 21, 2023 for Pirelli Tyre S.P.A. Mail Date: May 14, 2025 17 pages.

Restriction Requirement for U.S. Appl. No. 18/258,443, filed Jun. 20, 2023 on behalf of Pirelli Tyre S.P.A. Mail Date: May 5, 2025 7 pages.

Non-Final Office Action for U.S. Appl. No. 18/258,443, filed Jun. 20, 2023 on behalf of Pirelli Tyre S.P.A Mail Date: Sep. 12, 2025 18 pages.

First Chinese Office Action for Chinese Application No. 202180088113 filed Dec. 28, 2021 on behalf of Pirelli Tyre S.P.A. Mail Date: Dec. 24, 2025 (English + Original) 18 pages.

Notice of Allowance for U.S. Appl.No. 18/258,192 filed on Jun. 16, 2023 for Pirelli Tyre S.P.A. Mail Date: Nov. 13, 2025 12 pages.

\* cited by examiner

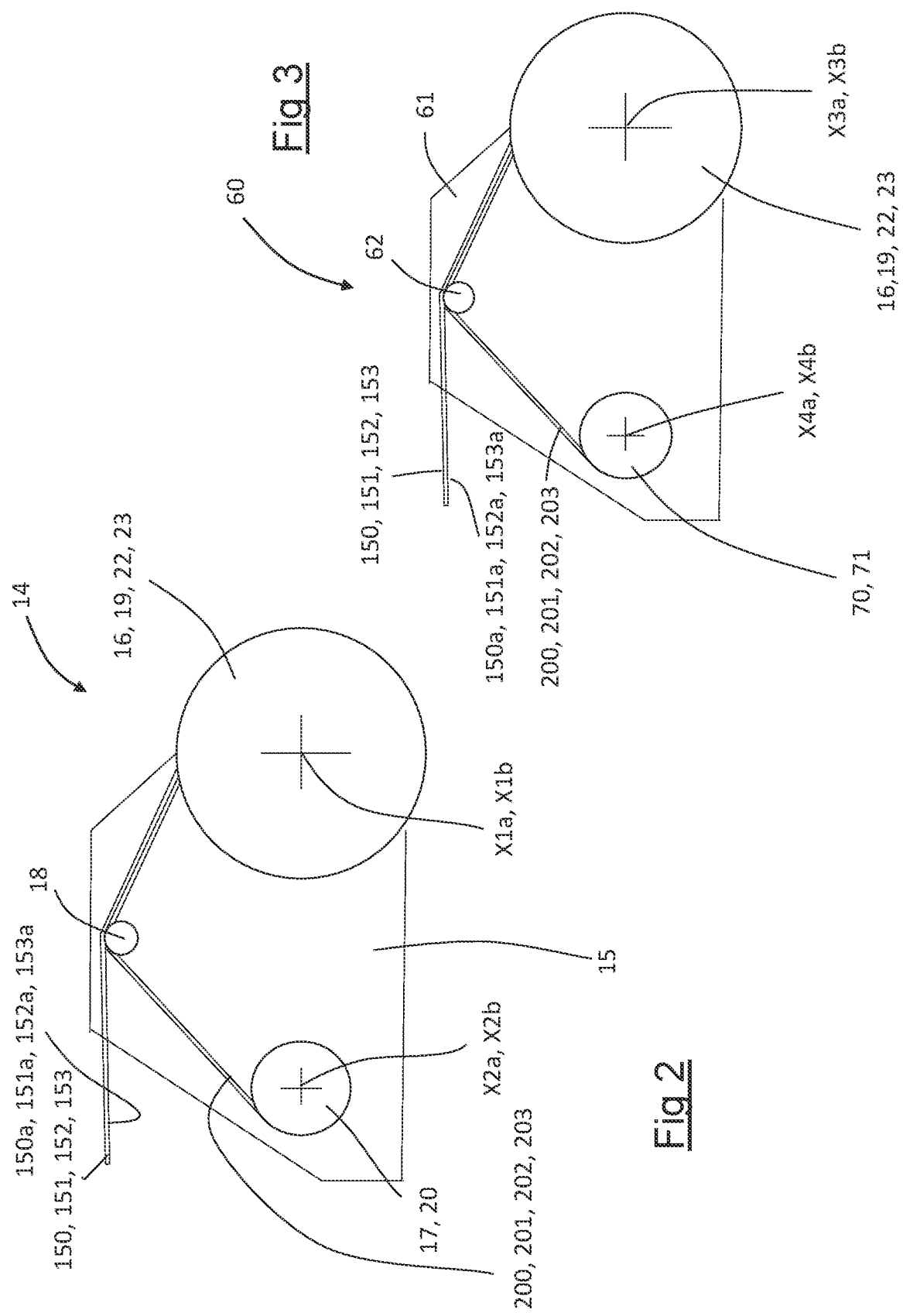

17, 20

31, 33

39a, 39b 400a, 400b 40a, 40b 38a, 38b 37a, 37b 35a, 35b 36a, 36b 34a, 34b 30, 32

16, 19, 22, 23

25a, 25b, 25c, 25d 27a, 27b, 27c, 27d 29a, 29b, 29c, 29d 28a, 28b, 28c, 28d 26a, 26b, 26c, 26d 200, 201, 202, 203

203a, 203b, 203c, 203d 200, 201, 202, 203

201a, 201b, 201c, 201d 202a, 202b, 202c, 202d 70, 71

73, 75

81a, 81b 400a, 400b 82a, 82b 79a, 79b 80a, 80b 78a, 78b 77a, 77b 72, 74

76a, 76b

METHOD FOR ARRANGING ELONGATED ELEMENTS TO BE USED IN A PROCESS FOR BUILDING TYRES FOR VEHICLE WHEELS AND PLANT FOR BUILDING TYRES FOR VEHICLE WHEELS

CROSS REFERENCE TO RELATED APPLICATIONS

The present application is the US National Stage of International Patent Application No. PCT/IB2021/062387, filed on Dec. 28, 2021, which in turn, claims priority to Italian Application No. IT 102020000032561, filed on Dec. 29, 2020.

The present invention relates to a process and a plant for building tyres for vehicle wheels and method for arranging elongated elements to be used in said process.

A tyre for vehicle wheels generally comprises a carcass structure, a crown structure arranged in radially outer position with respect to the carcass structure and a pair of sidewalls that represent the axially outer surfaces of the tyre, with respect to a mid-plane perpendicular to the rotation axis of said tyre.

The carcass structure comprises at least one carcass ply formed from reinforcing cords incorporated in a matrix of elastomeric material. The carcass ply has opposite end flaps respectively engaged with annular anchoring structures. The latter are arranged in the areas of the tyre usually identified with the name "beads" and are normally each formed by a substantially circumferential annular insert called "bead core" on which at least one filling insert is applied, in radially outer position, tapering radially going away from the rotation axis.

At the beads it is possible to provide specific reinforcing structures having the function of improving the transmission of torque to the tyre.

In the case of "tubeless" tyres, i.e. without an air chamber, a layer of elastomeric material, generally known as "liner", may also be provided in radially inner position with respect to the carcass structure to provide the necessary impermeability to the inflation air of the tyre. Generally, the liner extends from one bead to the other.

The crown structure comprises a belt structure and, in radially outer position with respect to the belt structure, a tread band made of elastomeric material.

The belt structure comprises one or more belt layers arranged radially juxtaposed over one another, having textile or metal reinforcing cords having orientation substantially parallel to the direction of circumferential extension of the tyre (zero degrees layer) and/or having crossed orientation.

Between the carcass structure and the belt structure it is possible to provide a layer of elastomeric material, called "under-belt", having the function of making the radially outer surface of the carcass structure as uniform as possible for the subsequent application of the belt structure.

Longitudinal and transverse grooves are typically shaped on the tread band, arranged to define a desired tread pattern. A so-called 'under-layer' made of elastomeric material of suitable properties to obtain a stable union between the belt structure and the tread band can be arranged between the tread band and the belt structure.

The sidewalls are made of elastomeric material and represent the axially outer surfaces with respect to the annular anchoring structures, to the carcass ply(-ies), to the belt layer(s) and possibly to at least one portion of tread band. For example, the sidewalls each extend from one of the side edges of the tread band up to the respective annular anchoring structure to the beads.

The sidewalls are intended to protect the carcass structure from atmospheric agents and lateral impacts (for example against curbs). In self-supporting tyres, suitable sidewall inserts are suitable for giving the tyre sufficient strength to adequately withstand the load of the vehicle when the tyre is used in a deflated state and for giving favourable properties of comfort when, on the other hand, the tyre is in normally-inflated operating conditions. A sidewall insert made of elastomeric material is preferably arranged in axially outer position with respect to the liner and in axially inner position with respect to each sidewall to define a structure suitable for adequately supporting the tyre in the deflated state, stopping the sidewall from yielding or bulging on itself, without compromising the normal travel conditions.

The term "elastomeric material" is meant to indicate a composition comprising at least one elastomeric polymer and at least one reinforcing filler. Preferably, such a composition also comprises additives like, for example, a cross-linking agent and/or a plasticizer. Thanks to the presence of the cross-linking agent, such a material can be cross-linked through heating, so as to form the end product.

The term "elongated element" is meant to indicate an element made of elastomeric material having predominant extension along a longitudinal direction thereof. Such an elongated element preferably consists of only elastomeric material.

The term "base surface" of the elongated element is meant to indicate the radially inner surface of each coil of elongated element when it is wound on a storage bobbin. Such a base surface corresponds to the lower surface of the elongated element once unwound from the storage bobbin and arranged on a substantially horizontal plane.

The term "elongated elements that are the same as each other" is meant to indicate elongated elements that have the same composition and geometry. Two elongated elements that are the same as each other consist of a same elastomeric material, have the same shape along a cross section perpendicular to the longitudinal direction of main extension and have the same dimensions along such a cross section. Two elongated elements that are the same as each other also have the same elongation in the longitudinal direction, or in any case such that the elongation of a first elongated element is comprised between 99% and 101% of the elongation of a second elongated element when subjected to a same load in the longitudinal direction.

The term "elongated elements that are different from each other" is meant to indicate elongated elements that have different composition and/or geometry, in which, in combination or alternatively, the elastomeric materials are different in composition, the respective shapes along a cross section perpendicular to the longitudinal direction of main extension are different from each other, such sections have different dimensions. Two elongated elements that are different from each other can also have the same elongation in the longitudinal direction, or in any case such that the elongation of a first elongated element is comprised between 99% and 101% of the elongation of a second elongated element when subjected to a same load in the longitudinal direction, or they can have a different elongation in the longitudinal direction such that the elongation of a first elongated element is less than 99% or greater than 101% of the elongation of a second elongated element, when subjected to a same load in the longitudinal direction.

The term "structural component" of a tyre is meant to indicate any portion thereof capable of carrying out its function or a part thereof. Examples of structural components of the tyre are the following: the carcass structure, the crown structure, or parts thereof, like liner, under-liner, anti-abrasive inserts, bead core, filling inserts in the area of the bead (and therefore the annular anchoring structures defined by bead cores and respective filling inserts), carcass ply(-ies), belt layer(s), belt under-layer, under-layer of the tread band, sidewalls, sidewall inserts, tread band, textile or metal reinforcements, reinforcing elements made of elastomeric material etc., or a part thereof.

The term "service fabric" is meant to indicate a fabric associated with an elongated element arranged to prevent coils of elongated element wound on a winding support from sticking together. Preferably, said service fabric is also configured to give the elongated element a desired structural consistency when it is wound on a winding support.

The term "self-supporting tyre" is meant to indicate a tyre that differs from a standard tyre in that it is capable of supporting the load of the vehicle under a considerable or total loss of pressure, for example when there is a puncture, allowing the driver to travel, for a certain distance, to reach a repair shop without having to stop to change the tyre in a potentially dangerous situation.

The term "winding in parallel" of two elongated elements is meant to indicate a simultaneous winding of a pair of elongated elements on one or more winding supports.

The term "winding diameter" of an elongated element on a storage bobbin or on a winding support is meant to indicate the distance between the rotation axis of the storage bobbin or of the winding support and the point of the elongated element still wound on the storage bobbin or on the winding support and radially farthest from said rotation axis.

The terms "axial", "axially", "radial", "radially", "circumferential" and "circumferentially" are used with reference to winding supports used in the tyre building process.

In particular, the terms "axial" and "axially" are meant as references/sizes arranged/measured or extending in a substantially parallel direction to a geometric rotation axis of the winding supports.

The terms "radial" and "radially" are meant as references/sizes arranged/measured or extending in a substantially perpendicular direction to a geometric rotation axis of the winding supports and lying in a plane comprising such a geometric rotation axis.

The terms "radially inner/outer" are meant to indicate respectively a position closer to or further away from said geometric rotation axis of the winding supports.

The terms "axially inner/outer" are meant to indicate respectively a position closer to or further away from a mid-plane perpendicular to the geometric rotation axis of the winding supports.

The terms "circumferential" and "circumferentially" are meant as references/sizes arranged/measured or extending along a circumference that extends around the geometric rotation axis of the winding supports.

A tyre for vehicle wheels comprises a plurality of structural components made of elastomeric material. Non-limiting examples of these include: the tread band, the sidewalls, the sidewall inserts, the so-called under-belt and/or under-layer layers, the liner, the annular reinforcing inserts and others.

In production processes of tyres for vehicle wheels at least some of such structural components are made from elongated elements that are wound, in a building line, on a forming drum.

In the Applicant's experience, at least for some types of tyres there is simultaneous deposition on the forming drum of two elongated elements that are the same as each other. An example of such elongated elements deposited simultaneously on the forming drum is a pair of elongated elements that, during the building of a self-supporting tyre, are deposited axially spaced apart on the forming drum, before or after the deposition of one or more carcass plies, to make a respective pair of sidewall inserts of the self-supporting tyre.

The Applicant has observed that in order to simultaneously deposit two elongated elements that are the same as each other on a forming drum, a process is currently provided in which two elongated elements of a same elastomeric material are drawn simultaneously from a single extrusion device.

As the elongated elements progressively come out from the extrusion device, they are deposited on a storage bobbin positioned in the extrusion line substantially downstream of the extrusion device. The deposition of the elongated elements is performed by winding the elongated elements in coils on the storage bobbin, simultaneously making two pluralities of coils axially adjacent to one another and spaced apart on the storage bobbin. During the winding on the storage bobbin, the base surfaces of the elongated elements are coupled with a service fabric that avoids direct contact between the coils of a same elongated element preventing them from sticking together. The service fabric is unwound from a service bobbin during the coupling with the elongated elements.

The storage bobbin with both of the elongated elements that are the same as each other wound is then moved and housed in a storage and, when it is needed, it is taken from the storage and arranged in a building line close to the forming drum.

In the building line, both of the elongated elements that are the same as each other are simultaneously unwound from the storage bobbin and simultaneously deposited on the forming drum to simultaneously make the desired pair of structural components made of elastomeric material. During the unwinding of the elongated elements, the service fabric is separated from the base surface of the elongated elements and wound on a service bobbin.

The Applicant has tackled the problem of building tyres in which the two elongated elements simultaneously deposited on the forming drum are different from each other. Such a requirement could for example be needed, in the Applicant's experience, during the building of a self-supporting tyre in which the sidewall insert of one side of the tyre is different from the sidewall insert of the other side of the tyre.

The Applicant has observed that it would not be possible to simultaneously deposit two elongated elements that are different from each other on the forming drum by actuating the process described above, since each storage bobbin comprises two elongated elements that are the same as each other.

The Applicant has however felt the need to simultaneously deposit two elongated elements that are different from each other on the forming drum without having to redesign or modify the extrusion line and/or the building line.

The Applicant has indeed realized that this would allow using pre-existing production plants, avoiding costs of redesigning, prototyping and production of new extrusion lines and new building lines. This would also allow avoiding to provide new production spaces to house new production plants in addition to those already existing.

The Applicant has observed that in order to use the same pre-existing building lines the building lines should be provided with storage bobbins already configured to simultaneously deposit two elongated elements that are different from each other on the forming drum.

The Applicant has however noted that in order to use the same pre-existing extrusion lines, every extruder device should continue both to simultaneously extrude respective elongated elements that are the same as each other, and to wind in parallel each pair of elongated elements extruded on a respective storage bobbin.

The Applicant has realized that it would be possible to provide, between the extrusion line and the storage or between the storage and the building line, a movement of at least some of the elongated elements wound on the storage bobbins, so as to change the arrangement of the elongated elements on the storage bobbins exiting from the extrusion line with respect to that on the storage bobbins entering the building line.

The Applicant has perceived that in order for such a change of the arrangement of the elongated elements on the storage bobbins not to result in any change of the operations carried out in the extrusion line and in the building line, it would be necessary to:

start from a first pair of elongated elements that are the same as each other, extruded simultaneously by an extruder device and wound on a first initial bobbin and from a second pair of elongated elements that are the same as each other but different from the elongated elements of the first pair of elongated elements, extruded simultaneously by the extruder device and wound on a second initial bobbin;

end up with a first pair of elongated elements that are different from each other wound on a first final bobbin and with a second pair of elongated elements that are different from each other wound on a second final bobbin.

The Applicant has finally found that by simultaneously winding two first elongated elements that are the same as each other respectively on a first winding support and a second winding support coupled together and by simultaneously winding two second elongated elements that are the same as each other, and different from the first elongated elements, respectively on a third winding support and a fourth winding support coupled together, it is possible to separate the first winding support from the second winding support and the third winding support from the fourth winding support and couple together the first and the third winding support and the second and the fourth winding support obtaining pairs of winding supports in which elongated elements that are different from each other to be made available to the building line are wound.

The present invention therefore relates, in a first aspect thereof, to a method for arranging elongated elements to be used in a process for building tyres for vehicle wheels.

Preferably, it is provided for to wind in parallel a first elongated element and a second elongated element of a first type respectively on a first winding support and on a second winding support.

Preferably, the first winding support and the second winding support are coupled in a rotatable manner about a first rotation axis.

Preferably, the elongated elements of the first type are the same as each other.

Preferably, it is provided for to wind in parallel a third elongated element and a fourth elongated element of a second type respectively on a third winding support and a fourth winding support.

Preferably, the third winding support and the fourth winding support are coupled and rotatable about a second rotation axis.

Preferably, the elongated elements of the second type are the same as each other.

Preferably, the elongated elements of the second type are different from the elongated elements of the first type.

Preferably, it is provided for to decouple the second winding support from the first winding support.

Preferably, it is provided for to decouple the fourth winding support from the third winding support.

Preferably, it is provided for to couple the second winding support with the third winding support.

Preferably, it is provided for to couple the fourth winding support with the first winding support.

The Applicant deems that such a method allows to use the pre-existing extrusion lines in a plant configured to extrude pairs of elongated elements that are the same as each other also in a process in which two elongated elements that are different from each other are deposited simultaneously on the forming drum. The Applicant has indeed verified that winding in parallel of first and second elongated elements that are the same as each other of a first type on a first and second winding support coupled together and winding in parallel of third and fourth elongated elements that are the same as each other of a second type different from the first type on a third and fourth winding support coupled together may be carried out in an extrusion line comprising an extruder device from which elongated elements that are the same as each other obtained from a same elastomeric material are simultaneously extruded. The Applicant has verified that the extruder device may, in a first step, be used to extrude the first type of elongated elements that are the same as each other and, after a change of elastomeric material to be extruded, may subsequently be used to extrude the second type of elongated elements that are the same as each other. The Applicant has also verified that it is possible to use two extruder devices each of which is configured to extrude pairs of elongated elements of one of the two types of elongated elements.

The Applicant also deems that such a method allows to use pre-existing building lines configured to allow two elongated elements that are the same as each other to be wound simultaneously on a forming drum. The Applicant has indeed verified that the first winding support coupled with the fourth winding support and/or the second winding support coupled with the third winding support allows to simultaneously unwind two elongated elements that are different from each other, allowing the simultaneous winding on the forming drum of two elongated elements that are different from each other.

The Applicant also deems that such a method allows to use the pre-existing storages, since they are already configured to store winding supports with wound elongated elements.

In a second aspect thereof, the invention relates to a process for building tyres for vehicle wheels.

Such a process preferably comprises applying the method for arranging elongated elements to be used in a process for building tyres for vehicle wheels in accordance with the first aspect of the present invention.

Preferably, coupling the first winding support with the fourth winding support comprises mounting the first winding support and the fourth winding support on a first coupling device.

Preferably, coupling the second winding support with the third winding support comprises mounting the second winding support and the third winding support on a second coupling device.

Preferably, it is provided for to arrange the first coupling device with the first winding support and the fourth winding support mounted on it, or the second coupling device with the second winding support and the third winding support mounted on it, in a building line close to a forming drum;

Preferably, it is provided for to simultaneously unwind an elongated element of the first type from the first winding support and an elongated element of the second type from the fourth winding support or to simultaneously unwind an elongated element of the first type from the second winding support and an elongated element of the second type from the third winding support and simultaneously winding them on the forming drum.

The Applicant deems that, in this way, it is possible to simultaneously deposit pairs of elongated elements that are different from each other on a forming drum without having to change the existing building lines.

In a third aspect thereof, the invention relates to a plant for building tyres for vehicle wheels.

Preferably, a winding station is provided that is configured to wind in parallel a first elongated element and a second elongated element of a first type that are the same as each other respectively on a first winding support and a second winding support.

Preferably, the first winding support and the second winding support are mounted on a first coupling device.

Preferably, the winding station is configured to wind in parallel a third elongated element and a fourth elongated element of a second type that are the same as each other respectively on a third winding support and a fourth winding support.

Preferably, the third winding support and the fourth winding support are mounted on a second coupling device.

Preferably, the elongated elements of the first type are different from the elongated elements of the second type.

Preferably, a configuring device is provided that is configured to transfer the second winding support on the second coupling device obtaining said first winding support and said fourth winding support mounted on said first coupling device.

Preferably, the configuring device is configured to transfer the fourth winding support on the first coupling device obtaining said second winding support and said third winding support mounted on said second coupling device.

Preferably, an unwinding station is provided that is configured to simultaneously unwind an elongated element of the first type from the first winding support and an elongated element of the second type from the fourth winding support or to simultaneously unwind an elongated element of the first type from the second winding support and an elongated element of the second type from the third winding support;

Preferably, a building line is provided comprising at least one forming drum operatively associated with the unwinding station to simultaneously receive elongated elements from the unwinding station.

In at least one of the aforementioned aspects, the present invention can have at least one of the preferred characteristics described hereinafter.

Preferably, the first elongated element and the secondo elongated element are made simultaneously in an extrusion line and transferred to the winding station.

Preferably, the extrusion of the first elongated element and of the second elongated element takes place in an extruding device of the extrusion line.

Preferably, the third elongated element and the fourth elongated element are made simultaneously in the same extrusion line after the first elongated element and the second elongated element and transferred to the winding station.

Preferably, the extrusion of the third elongated element and of the fourth elongated element takes place after a change of elastomeric material in the extrusion line.

Preferably, the extrusion of the third elongated element and of the fourth elongated element takes place in said extruding device of said extrusion line.

Alternatively, the third elongated element and the fourth elongated element are made simultaneously in a further extrusion line.

In this case, preferably, the extrusion of the third elongated element and of the fourth elongated element takes place in a further extruding device of said further extrusion line.

Preferably, winding in parallel the first elongated element and the second elongated element, respectively, on the first winding support and on the second winding support is preceded by mounting the first winding support and the second winding support on a first coupling device.

The first coupling device allows to keep the first winding support and the second winding support associated with each other while the first elongated element and the second elongated element are simultaneously wound on the first winding support and on the second winding support.

Preferably, winding in parallel the third elongated element and the fourth elongated element, respectively, on the third winding support and on the fourth winding support is preceded by mounting the third winding support and the fourth winding support on a second coupling device.

The second coupling device allows to keep the third winding support and the fourth winding support associated with each other while the third elongated element and the fourth elongated element are simultaneously wound on the third winding support and on the fourth winding support.

The first coupling device preferably comprises a first coupling portion and a second coupling portion rotatable about a rotation axis.

Preferably, mounting the first winding support on the first coupling device comprises mounting the first winding support on the first coupling portion.

Preferably, mounting the second winding support on the first coupling device comprises mounting the second winding support on the second coupling portion.

In a first variant embodiment of the first coupling device, the first coupling portion and the second coupling portion rotate as a unit about the rotation axis.

In a second variant embodiment of the first coupling device, the first coupling portion and the second coupling portion are rotatable about the rotation axis with respect to one another.

The second coupling device preferably comprises a first coupling portion and a second coupling portion rotatable about a rotation axis.

Preferably, mounting the third winding support on the second coupling device comprises mounting the third winding support on the first coupling portion of the second coupling device.

Preferably, mounting the fourth winding support on the second coupling device comprises mounting the fourth winding support on the second coupling portion of the second coupling device.

In a first variant embodiment of the second coupling device, the first coupling portion and the second coupling portion of the second coupling device rotate as a unit about the rotation axis.

In a second variant embodiment of the second coupling device, the first coupling portion and the second coupling portion of the second coupling device are rotatable about the rotation axis with respect to one another.

The first variant embodiment of the first coupling device is preferably used when the first elongated element and the fourth elongated element have winding diameters that are the same as each other.

The first variant embodiment of the second winding device is preferably used when the second elongated element and the third elongated element have winding diameters that are the same as each other.

The second variant embodiment of the first coupling device is preferably used when the first elongated element and the fourth elongated element have winding diameters that are different from each other.

The second variant embodiment of the second winding device is preferably used when the second elongated element and the third elongated element have winding diameters that are different from each other.

Preferably, winding in parallel the first elongated element and the second elongated element comprises associating a first service fabric with the first elongated element and a second service fabric with the second elongated element.

This activity is preferably carried out in the winding station.

Each service fabric is preferably associated with a base surface of the respective elongated element. The service fabrics give the elongated elements a desired structural consistency, thus avoiding the possibility of the elongated elements deforming during the winding and unwinding from a winding support. The service fabrics also avoid direct contact of elastomeric material when the elongated elements are wound in coils.

Preferably, the first service fabric is unwound from a first auxiliary winding support.

Preferably, the second service fabric is unwound from a first auxiliary winding support.

Preferably, the unwinding of the first service fabric and of the second service fabric from the first auxiliary winding support takes place simultaneously with the winding in parallel of the first elongated element and of the second elongated element on the first winding support and on the second winding support.

Preferably, the winding of the first elongated element on the first winding support takes place by means of a pulling action exerted by the first service fabric after the coupling with the first elongated element.

Preferably, the winding of the second elongated element on the second winding support takes place by means of a pulling action exerted by the second service fabric after the coupling with the second elongated element.

Preferably, winding in parallel the third elongated element and the fourth elongated element comprises associating a third service fabric with the third elongated element and a fourth service fabric with the fourth elongated element.

This activity is preferably carried out in the winding station.

Each service fabric is preferably associated with a base surface of the respective elongated element.

Preferably, the third service fabric is unwound from a second auxiliary winding support.

Preferably, the fourth service fabric is unwound from a second auxiliary winding support.

Preferably, the unwinding of the third service fabric and of the fourth service fabric from the second auxiliary winding support takes place simultaneously with the winding in parallel of the third elongated element and of the fourth elongated element on the third winding support and on the fourth winding support.

Preferably, the winding of the third elongated element on the third winding support takes place by means of a pulling action exerted by the third service fabric after the coupling with the third elongated element.

Preferably, the winding of the fourth elongated element respectively on the fourth winding support takes place by means of a pulling action exerted by the fourth service fabric after the coupling with the fourth elongated element.

In a variant embodiment of the first service fabric, it comprises a resting surface and respective two axial end shoulders.

In this case, preferably it is provided for to associate the first elongated element with the resting surface of the first service fabric between said two axial end shoulders.

In a variant embodiment of the second service fabric, it comprises a resting surface and respective two axial end shoulders.

In this case, preferably it is provided for to associate the second elongated element with the resting surface of the second service fabric between said two axial end shoulders.

Preferably, the two axial end shoulders of the first service fabric have equal extension in the radial direction and have greater extension in the radial direction than the extension in the radial direction of the first elongated element.

Preferably, the two axial end shoulders of the second service fabric have equal extension in the radial direction and have greater extension in the radial direction than the extension in the radial direction of the second elongated element.

In this way, when the first and the second elongated elements are wound on the respective winding supports, supported by the respective first and second service fabrics, the winding diameters of the first and of the second elongated elements become equal to the winding diameter of the first and/or second service fabric.

Preferably, when the first service fabric and the first elongated element are wound on the first winding support the axial end shoulders of the first service fabric of one coil are in contact with the axial end shoulders of the first service fabric of a radially adjacent coil.

Similarly, preferably, when the second service fabric and the second elongated element are wound on the second winding support the axial end shoulders of the second service fabric of one coil are in contact with the axial end shoulders of the second service fabric of a radially adjacent coil.

In a variant embodiment of the third service fabric, it comprises a resting surface and respective two axial end shoulders.

In this case, preferably it is provided for to associate the third elongated element with the resting surface of the third service fabric between said two axial end shoulders.

In a variant embodiment of the fourth service fabric, it comprises a resting surface and respective two axial end shoulders.

In this case, preferably it is provided for to associate the fourth elongated element with the resting surface of the fourth service fabric between said two axial end shoulders.

Preferably, the two axial end shoulders of the third service fabric have equal extension in the radial direction and have greater extension in the radial direction than the extension in the radial direction of the third elongated element.

Preferably, the two axial end shoulders of the fourth service fabric have equal extension in the radial direction and have greater extension in the radial direction than the extension in the radial direction of the fourth elongated element.

In this way, when the third elongated element and the fourth elongated element are wound on the respective winding supports with the respective third and fourth service fabric, the winding diameters of the third and fourth elongated elements become equal to the winding diameter of the third and/or fourth service fabric.

Preferably, when the third service fabric and the third elongated element are wound on the third winding support the axial end shoulders of the third service fabric of one coil are in contact with the axial end shoulders of the third service fabric of a radially adjacent coil.

Similarly, preferably, when the fourth service fabric and the fourth elongated element are wound on the fourth winding support the axial end shoulders of the fourth service fabric of one coil are in contact with the axial end shoulders of the fourth service fabric of a radially adjacent coil.

This type of service fabrics is particularly preferred when the first elongated element and the fourth elongated element have winding diameters that are different from each other and when the second elongated element and the third elongated element have winding diameters that are different from each other.

Preferably, decoupling the second winding support from the first winding support comprises dismounting the second winding support from the first coupling device.

Preferably, decoupling the second winding support from the first winding support comprises leaving the first winding support mounted on the first coupling device.

Preferably, decoupling the fourth winding support from the third winding support comprises dismounting the fourth winding support from the second coupling device.

Preferably, decoupling the fourth winding support from the third winding support comprises leaving the third winding support mounted on the second coupling device.

These activities are preferably carried out in a configuring device.

Preferably, said configuring device comprises a first configuration structure.

Preferably, the first configuration structure comprises a first fixed carriage configured to receive the first winding support.

Preferably, the first configuration structure comprises a first movable carriage configured to receive the second winding support.

Preferably, said configuring device comprises a second configuration structure.

Preferably, the second configuration structure comprises a second fixed carriage configured to receive the third winding support.

Preferably, the second configuration structure comprises a second movable carriage configured to receive the fourth winding support.

Preferably, said first movable carriage is movable into a respective first position in which it is beside the first fixed carriage.

Preferably, said first movable carriage is movable into a respective second position in which it is away from the first fixed carriage.

Preferably, said first movable carriage is movable into a respective third position in which it is beside the said second fixed carriage.

Preferably, said second movable carriage is movable into a respective first position in which it is beside the second fixed carriage.

Preferably, said second movable carriage is movable into a respective second position in which it is away from the second fixed carriage.

Preferably, said second movable carriage is movable into a respective third position in which it is beside the said first fixed carriage.

Preferably, leaving the first winding support mounted on the first coupling device comprises associating the first winding support with the first fixed carriage.

Preferably, the first winding support is left mounted on the first coupling portion of the first coupling device.

Preferably, dismounting the second winding support from the first coupling device comprises associating the second winding support with the first movable carriage.

Preferably, this activity is carried out with the first movable carriage arranged in its first position.

Preferably, it is provided for to subsequently move the first movable carriage, with the second winding support associated, away from the first coupling device.

Preferably, this activity is carried out by bringing the first movable carriage into its second position.

Preferably, moving the first movable carriage with the second winding support associated comprises dismounting the second winding support from the second coupling portion of the first coupling device.

Preferably, leaving the third winding support mounted on the second coupling device comprises associating the third winding support with the second fixed carriage.

Preferably, the third winding support is left mounted on the first coupling portion of the second coupling device.

Preferably, dismounting the fourth winding support from the second coupling device comprises associating the fourth winding support with the second movable carriage.

Preferably, this activity is carried out with the second movable carriage arranged in its first position.

Preferably, it is provided for to subsequently move the second movable carriage, with the associated fourth winding support, away from the second coupling device.

Preferably, this activity is carried out by bringing the second movable carriage into its second position.

Moving the second movable carriage with the associated fourth winding support comprises dismounting the fourth winding support from the second coupling portion of the second coupling device.

Preferably, coupling the fourth winding support with the first winding support comprises mounting the fourth winding support on the first coupling device.

Preferably, coupling the second winding support with the third winding support comprises mounting the second winding support on the second coupling device.

Preferably, mounting the fourth winding support on the first coupling device comprises moving the second movable carriage with the associated fourth winding support towards the first coupling device.

Preferably, this activity is carried out by bringing the second movable carriage into its third position.

Preferably, the fourth winding support is mounted on the second portion of the first coupling device.

Preferably, mounting the second winding support on the second coupling device comprises moving the first movable carriage with the associated second winding support towards the second coupling device.

Preferably, this activity is carried out by bringing the first movable carriage into its third position.

Preferably, the second winding support is mounted on the second portion of the second coupling device.

Preferably, the first winding support is decoupled from the first fixed carriage.

This activity is preferably carried out with the first winding support mounted on the first coupling device.

Preferably, the fourth winding support is decoupled from the second movable carriage.

This activity is preferably carried out with the fourth winding support mounted on the first coupling device.

Preferably, the first winding support is decoupled from the first fixed carriage while the fourth winding support is decoupled from the second movable carriage.

Preferably, the third winding support is decoupled from the second fixed carriage.

This activity is preferably carried out with the third winding support mounted on the second coupling device.

Preferably, the second winding support is decoupled from the first movable carriage.

This activity is preferably carried out with the second winding support mounted on the second coupling device.

Preferably, the third winding support is decoupled from the second fixed carriage while the second winding support is decoupled from the first movable carriage.

Arranging the first coupling device with the first winding support and the fourth winding support mounted on it in a building line close to a forming drum preferably comprises bringing the first coupling device with the first winding support and the fourth winding support mounted on it to an unwinding station.

Preferably, simultaneously unwinding an elongated element of the first type from the first winding support and an elongated element of the second type from the fourth winding support comprises simultaneously removing said first service fabric from the first elongated element and said fourth service fabric from the fourth elongated element.

This activity is preferably carried out in the unwinding station.

Preferably, the unwinding of the first elongated element from the first winding support takes place by means of a pulling action exerted on the first service fabric.

Preferably, the unwinding of the fourth elongated element from the fourth winding support takes place by means of a pulling action exerted on the fourth service fabric.

Preferably, the first service fabric removed from the first elongated element is collected on a first collecting winding support.

Preferably, the fourth service fabric removed from the fourth elongated element is collected on the first collecting winding support.

Preferably, the first collecting winding support is structurally the same as the first auxiliary winding support.

Preferably, the simultaneous removal and the collection of the first service fabric and of the fourth service fabric takes place during the simultaneous unwinding of the first elongated element and of the fourth elongated element.

Arranging the second coupling device with the second winding support and the third winding support mounted on it in a building line close to a forming drum preferably comprises bringing the second coupling device with the second winding support and the third winding support mounted on it to the unwinding station.

This activity is carried out after, before or as an alternative to arranging the first coupling device with the first winding support and the fourth winding support mounted on it in the building line close to the forming drum.

Preferably, simultaneously unwinding an elongated element of the first type from the second winding support and an elongated element of the second type from the third winding support comprises simultaneously removing said second service fabric from the second elongated element and said third service fabric from the third elongated element.

This activity is preferably carried out in the unwinding station.

Preferably, the unwinding of the second elongated element from the second winding support takes place by means of a pulling action exerted on the second service fabric.

Preferably, the unwinding of the third elongated element from the third winding support takes place by means of a pulling action exerted on the third service fabric.

Preferably, the second service fabric removed from the second elongated element is collected on a second collecting winding support.

Preferably, the third service fabric removed from the third elongated element is collected on the second collecting winding support.

Preferably, the second collecting winding support is structurally the same as the first collecting winding support.

Preferably, the simultaneous removal and the collection of the second service fabric and of the third service fabric takes place during the simultaneous unwinding of the second elongated element and of the third elongated element.

Preferably, the first winding support comprises a first storage bobbin.

Preferably, the second winding support comprises a second storage bobbin.

Preferably, the third winding support comprises a third storage bobbin.

Preferably, the fourth winding support comprises a fourth storage bobbin.

Preferably, all of the storage bobbins have the same shape and size.

Preferably, winding in parallel the first elongated element on the first winding support and the second elongated element on the second winding support comprises winding the first elongated element on the first storage bobbin and winding the second elongated element on the second storage bobbin.

Preferably, winding in parallel the third elongated element on the third winding support and the fourth elongated element on the fourth winding support comprises winding the third elongated element on the third storage bobbin and winding the fourth elongated element on the fourth storage bobbin.

Preferably, the first auxiliary winding support comprises a first auxiliary storage bobbin having a winding surface sized to receive a service fabric.

Preferably, the first auxiliary winding support comprises a second auxiliary storage bobbin having a winding surface sized to receive a service fabric.

The first and the second auxiliary storage bobbins are preferably structurally distinct.

The first and the second auxiliary storage bobbins are preferably coupled together to rotate about a common rotation axis.

Preferably, the second auxiliary winding support comprises a first auxiliary storage bobbin having a winding surface sized to receive a service fabric.

Preferably, the second auxiliary winding support comprises a second auxiliary storage bobbin having a winding surface sized to receive a service fabric.

The first and the second auxiliary storage bobbins of the second auxiliary winding support are preferably structurally distinct.

The first and the second auxiliary storage bobbins of the second auxiliary winding support are preferably coupled together to rotate about a common rotation axis.

Preferably, the first collecting winding support comprises a first collecting storage bobbin having a winding surface sized to receive a service fabric.

Preferably, the first collecting winding support comprises a second collecting storage bobbin having a winding surface sized to receive a service fabric.

The first and the second collecting storage bobbins are preferably structurally distinct.

The first and the second collecting storage bobbins are preferably coupled together to rotate about a common rotation axis.

Preferably, the second collecting winding support comprises a first collecting storage bobbin having a winding surface sized to receive a service fabric.

Preferably, the second collecting winding support comprises a second collecting storage bobbin having a winding surface sized to receive a service fabric.

The first and the second collecting storage bobbins of the second collecting winding support are preferably structurally distinct.

The first and the second collecting storage bobbins of the second collecting winding support are preferably coupled together to rotate about a common rotation axis.

Preferably, before decoupling the second winding support from the first winding support, the first winding support and the second winding support are temporarily stored in a storage.

Preferably, after having wound in parallel the first elongated element and the second elongated element on the first winding support and on the second winding support, the first winding support and the second winding support are transferred from the winding station into a storage.

Preferably, before decoupling the second winding support from the first winding support, the first winding support and the second winding support are transferred from the storage to the configuring device.

Preferably, before decoupling the fourth winding support from the third winding support, the third winding support and the fourth winding support are temporarily stored in a storage.

Preferably, after having wound in parallel the third elongated element and the fourth elongated element on the third winding support and on the fourth winding support, the third winding support and the fourth winding support are transferred from the winding station into a storage.

Preferably, before decoupling the fourth winding support from the third winding support, the third winding support and the fourth winding support are transferred from the storage to the configuring device.

Preferably, before arranging the first coupling device with the first winding support and the fourth winding support mounted on it in a building line, the first winding support and the fourth winding support are temporarily stored in a further storage.

Preferably, after having coupled the first winding support and the fourth winding support, they are transferred from the configuring device to the further storage.

Preferably, before arranging the second coupling device with the second winding support and the third winding support mounted on it in a building line, the second winding support and the third winding support are temporarily stored in a further storage.

Preferably, after having coupled the second winding support and the third winding support, they are transferred from the configuring device to the further storage.

Preferably, an extrusion line is provided comprising at least one extruding device configured to extrude a first elongated element and a second elongated element of a first type or a third elongated element and a fourth elongated element of a second type.

Preferably, said winding station is operatively associated with the extrusion line.

Further characteristics and advantages of the present invention will become clearer from the following detailed description of preferred embodiments thereof, made with reference to the attached drawings.

In such drawings:

FIGS. 2 and 3 are schematic representations of some parts of the plant of FIG. 1;

Figure 1:
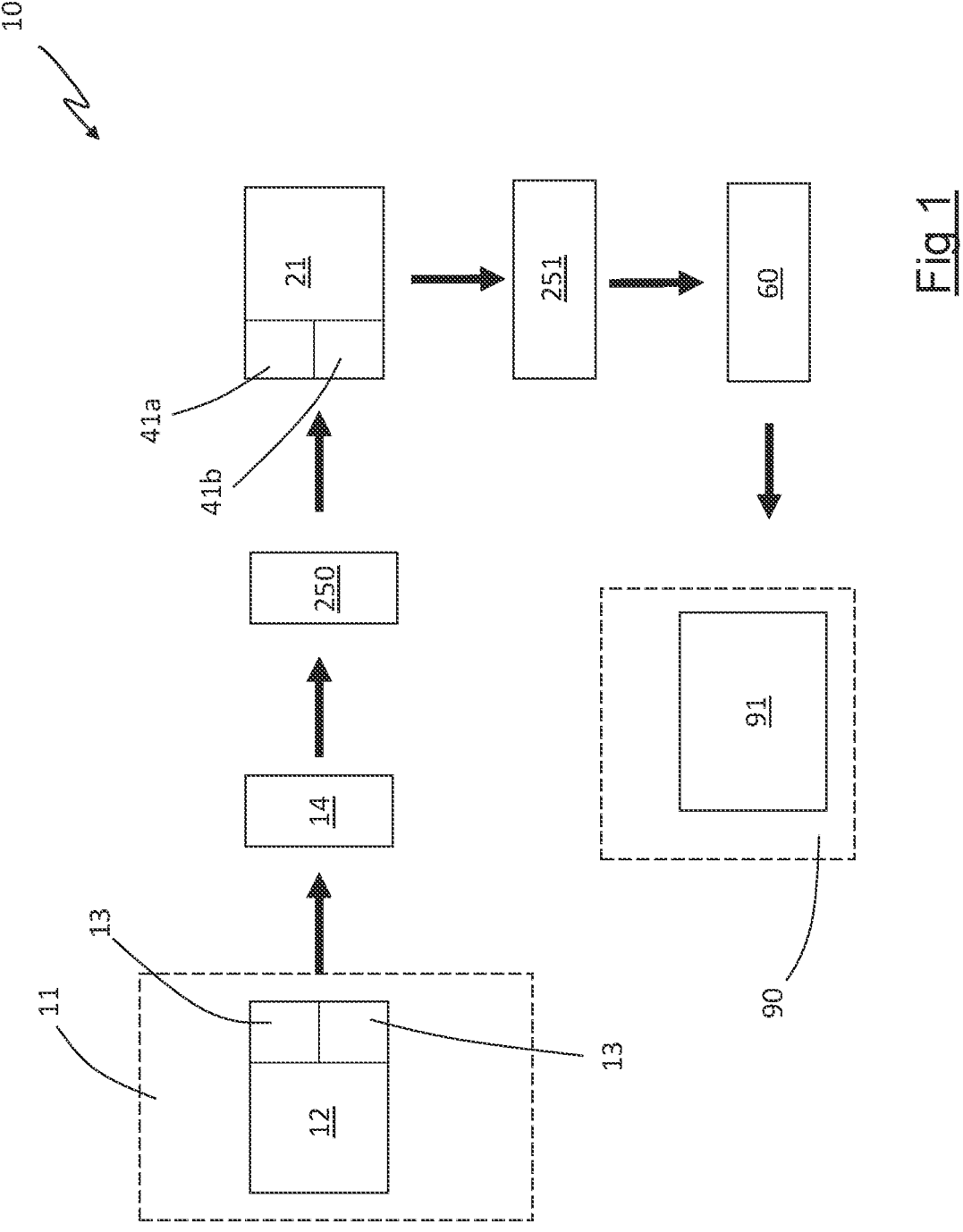
FIG. 1 is a schematic representation of a plant for building tyres for vehicle wheels in accordance with the present invention.

With reference to FIG. 1, a plant for building tyres for vehicle wheels in accordance with the present invention has been wholly indicated with reference numeral 10.

The plant 10 comprises an extrusion line 11 of elongated elements made of elastomeric material.

The extrusion line 11 comprises an extruding device 12 configured to operate on an elastomeric material and extrude it in the form of elongated element. The extrusion line 11 comprises two shaping elements 13 configured to operate on a pair of elongated elements exiting from the extruding device 12 and obtain a first elongated element 150 and a second elongated element 151 of a first type that are the same as each other. The same extrusion line 11 can be used, after a change of elastomeric material, to provide a second pair of elongated elements, in particular a third elongated element 152 and a fourth elongated element 153 of a second type that are the same as each other and different from the first elongated element 150 and from the second elongated element 151.

The plant 10 also comprises a winding station 14 in which the extruded elongated elements are wound on winding supports. FIG. 2 schematically represents a winding station 14 which operates on the first elongated element 150 and on the second elongated element 151. The same winding station 14 (or an analogous winding station) is configured to operate on the third elongated element 152 and on the fourth elongated element 153. Therefore, what has been described with reference to the winding station 14 when operating on the first elongated element 150 and on the second elongated element 151 is valid for the same winding station 14 (or for an analogous winding station) when operating on the third elongated element 152 and on the fourth elongated element 153.

The winding station 14 comprises a frame 15 on which a first winding support 16 and a second winding support 19 can be mounted and dismounted, which are rotatable about a common rotation axis X1a. On the frame 15 it is also possible to mount and dismount a first auxiliary winding support 17 able to rotate about a respective rotation axis X2a.

The first auxiliary winding support 17 is configured to unwind a first service fabric 200 and a second service fabric 201. The first service fabric 200 and the second service fabric 201 are simultaneously fed to a coupling roller 18 on which the first elongated element 150 and the second elongated element 151 are also fed. At the coupling roller 18, the first service fabric 200 is coupled with a base surface 150a of the first elongated element 150 and the second service fabric 201 is coupled with a base surface 151a of the second elongated element 151.

The first elongated element 150 and the second elongated element 151 with the respective coupled service fabrics 200, 201 are simultaneously wound in coils respectively on the first winding support 16 and on the second winding support 19.

This activity can be carried out by motorizing the rotation axis X1a of the first winding support 16 and of the second winding support 19 and leaving the coupling roller 18 idle. The rotation axis X1a of the first auxiliary winding support 17 can be idle or preferably slightly braked. Alternatively, both the rotation axis X1a of the first winding support 16 and the coupling roller 18 can be motorized and the rotation axis X2a of the first auxiliary winding support 17 can be idle or preferably slightly braked. In any case, the winding of the first elongated element 150 and of the second elongated element 151 on the first winding support 16 and on the second winding support 19 is carried out by exerting a pulling or traction action on the first service fabric 200 and on the second service fabric 201 by the first winding support 16 and the second winding support 19.

Similarly, when the winding station 14 is used with the third elongated element 152 and the fourth elongated element 153, a third winding support 22 and a fourth winding support 23 able to rotate about a common rotation axis X1b can be mounted and dismounted on the frame 15. On the frame 15 it is also possible to mount and dismount a second auxiliary winding support 20 able to rotate about a respective rotation axis X2b.

The second auxiliary winding support 20 is configured to unwind a third service fabric 202 and a fourth service fabric 203 in the same ways described above with reference to the first service fabric and to the second service fabric 200, 201. At the coupling roller 18, the third service fabric 202 is coupled with a base surface 152a of the third elongated element 152 and the fourth service fabric 203 is coupled with a base surface 153a of the fourth elongated element 153.

The third elongated element 152 and the fourth elongated element 153 with respective coupled service fabrics 202, 203 are simultaneously wound in coils respectively on the third winding support 22 and on the fourth winding support 23 in the same ways described above with reference to the first elongated element 150 and to the second elongated element 151.

Figures 9, 10:
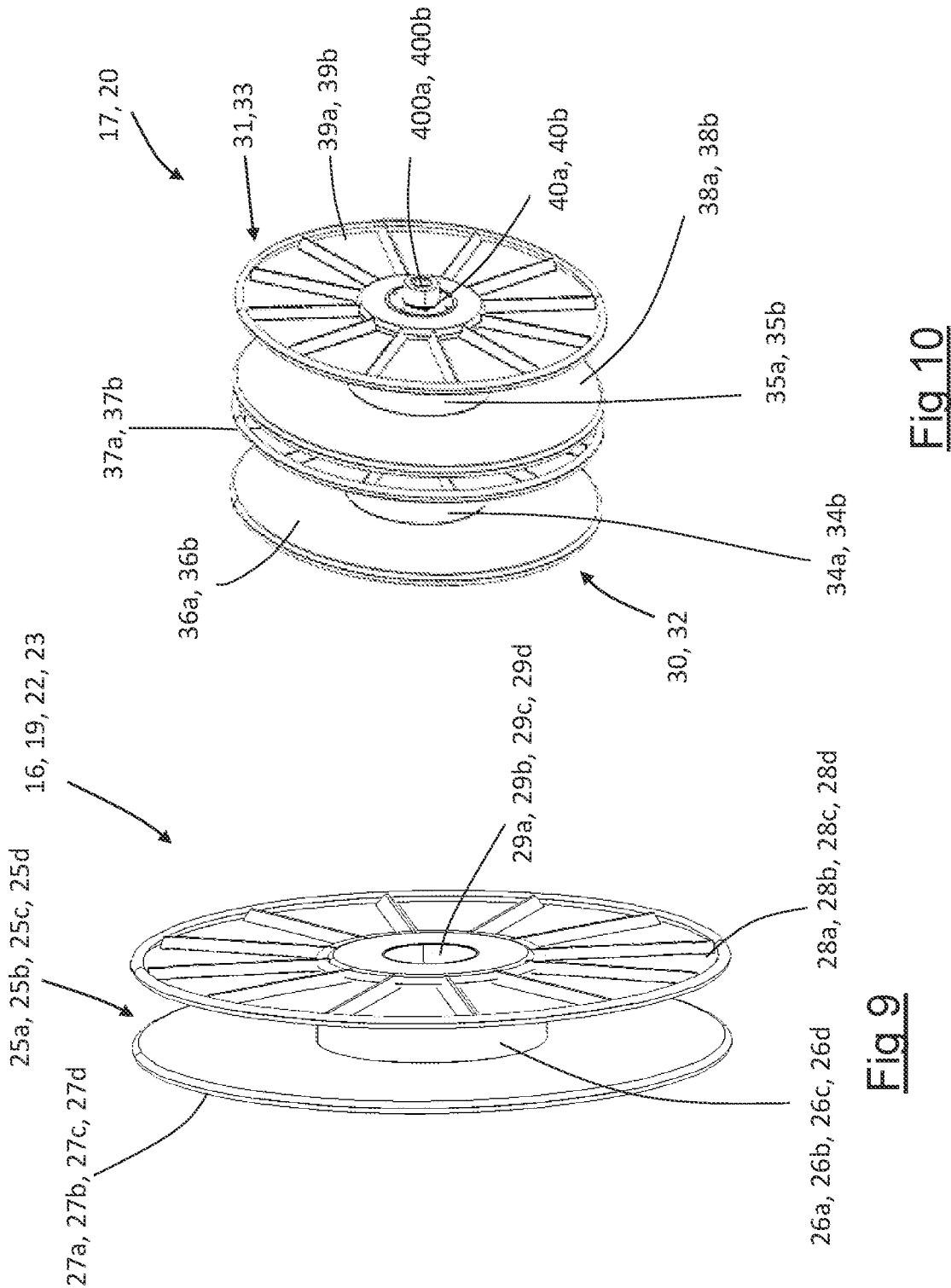
FIGS. 9 to 13 represent some components used in a method for arranging elongated elements in accordance with the present invention.

As shown in FIG. 9, the winding supports 16, 19, 22, 23 each comprise a respective storage bobbin 25a, 25b, 25c, 25d.

Each storage bobbin 25a, 25b, 25c, 25d comprises a winding surface 26a, 26b, 26c, 26d sized to receive an elongated element. The winding surface 26a, 26b, 26c, 26d is axially delimited by a first annular body 27a, 27b, 27c, 27d and by a second annular body 28a, 28b, 28c, 28d. The winding surface 26a, 26b, 26c, 26d is substantially cylindrical and extends around a through cavity 29a, 29b, 29c, 29d able to be crossed by a coupling device 400a, 400b.

The first auxiliary winding support 17 and the second auxiliary winding support 20 are shown in FIG. 10.

Each auxiliary winding support 17, 20 comprises a first auxiliary storage bobbin 30, 32 and a second auxiliary storage bobbin 31, 33.

The first auxiliary storage bobbin 30, 32 and the second auxiliary storage bobbin 31, 33 comprise a winding surface 34a, 34b, 35a, 35b sized to wind a respective service fabric in coils. The winding surface 34a, 34b of the first auxiliary storage bobbin 30, 32 and the winding surface 35a, 35b of the second auxiliary storage bobbin 31, 33 are axially delimited by a first annular body 36a, 36b, 38a, 38b and by a second annular body 37a, 37b, 39a, 39b. The winding surfaces 34a, 34b, 35a, 35b are substantially cylindrical and extend around respective through cavities 40a, 40b able to be crossed by a coupling device 400a, 400b configured to structurally couple the first auxiliary storage bobbin 30, 32 and the second auxiliary storage bobbin 31, 33 and make them rotatable, possibly independently from one another, about said rotation axis X2a, X2b.

When the first winding support 16 and the second winding support 19 are rotatably mounted in the winding station 14, the first winding support 16 and the second winding support 19 are mounted on a first coupling device 400a that physically connects the first winding support 19 and the second winding support 22 and that makes the first winding support 19 and the second winding support 22 rotatable about said rotation axis X1a.

Similarly, when the second winding support 22 and the third winding support 23 are rotatably mounted in the winding station 14, the second winding support 22 and the third winding support 23 are mounted on a second coupling device 400b that physically connects the third winding support 22 and the fourth winding support 23 and that makes the third winding support 22 and the fourth winding support 23 rotatable about said rotation axis X1b.

The first service fabric 200, the second service fabric 201, the third service fabric 202 and the fourth service fabric 203 are preferably made of polythene, nylon, Mylar®, polyester, or Meraklon® and are the same as each other.

Figures 11, 12, 13:
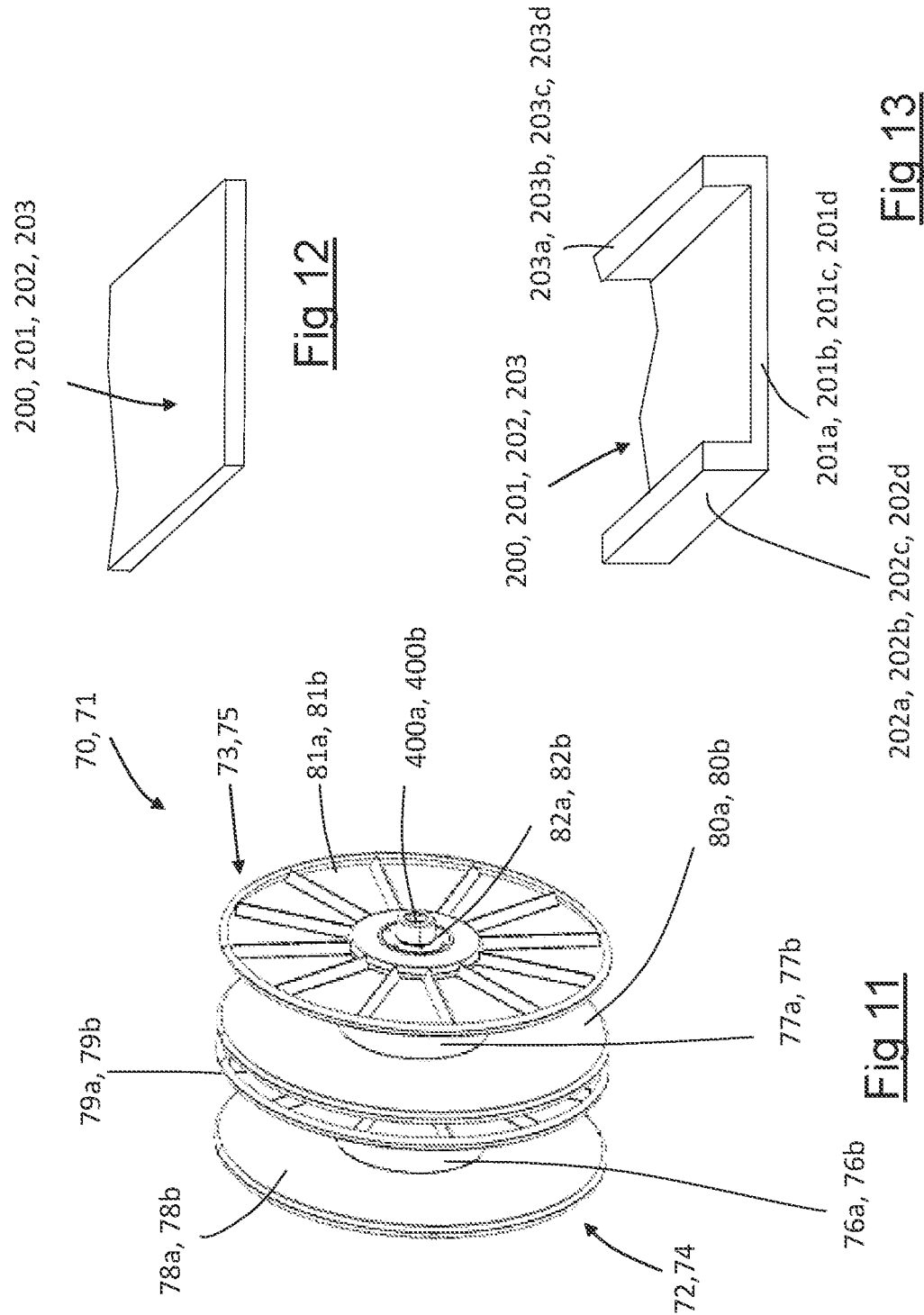

In a first embodiment illustrated in FIG. 12, such service fabrics are tape-like elements axially sized to each receive a single elongated element, and the same as each other.

In a second embodiment illustrated in FIG. 13, each service fabric 200, 201, 202, 203 comprises a resting surface 201a, 201b, 201c, 201d axially sized to receive a single elongated element. The resting surface 201a, 201b, 201c, 201d is axially delimited by a first axial end shoulder 202a, 202b, 202c, 202d and by a second axial end shoulder 203a, 203b, 203c, 203d. Such shoulders have an extension in the radial direction that is the same as each other and greater than the extension in the radial direction of the elongated element intended to be received on the resting surface 201a, 201b, 201c, 201d. When a service fabric is wound in coils, two radially adjacent coils are radially spaced apart by an amount equal to the extension in the radial direction of the first axial end shoulder 202a, 202b, 202c, 202d or of the second axial end shoulder 203a, 203b, 203c, 203d. Two radially adjacent coils therefore have juxtaposed portions of the first axial end shoulder 202a, 202b, 202c, 202d and corresponding juxtaposed portions of the second axial end shoulder 203a, 203b, 203c, 203d.

The plant 10 also comprises a storage 250 configured to temporarily house the winding supports 16, 19, 22, 23. The winding supports 16, 19, 22, 23 are transferred from the winding station 14 to the storage 250.

The plant 10 also comprises a configuring device 21 configured to operate on the winding supports 16, 19, 22, 23 to reconfigure them in a different configuration from that in which they come out from the winding station.

The first winding support 16, the second winding support 19, the third winding support 22 and the fourth winding support 23 are transferred to the configuring device 21 from the storage 250. Alternatively, the first winding support 16, the second winding support 19, the third winding support 22 and the fourth winding support 23 are transferred to the configuring device 21 directly from the winding device 14.

Figure 8:
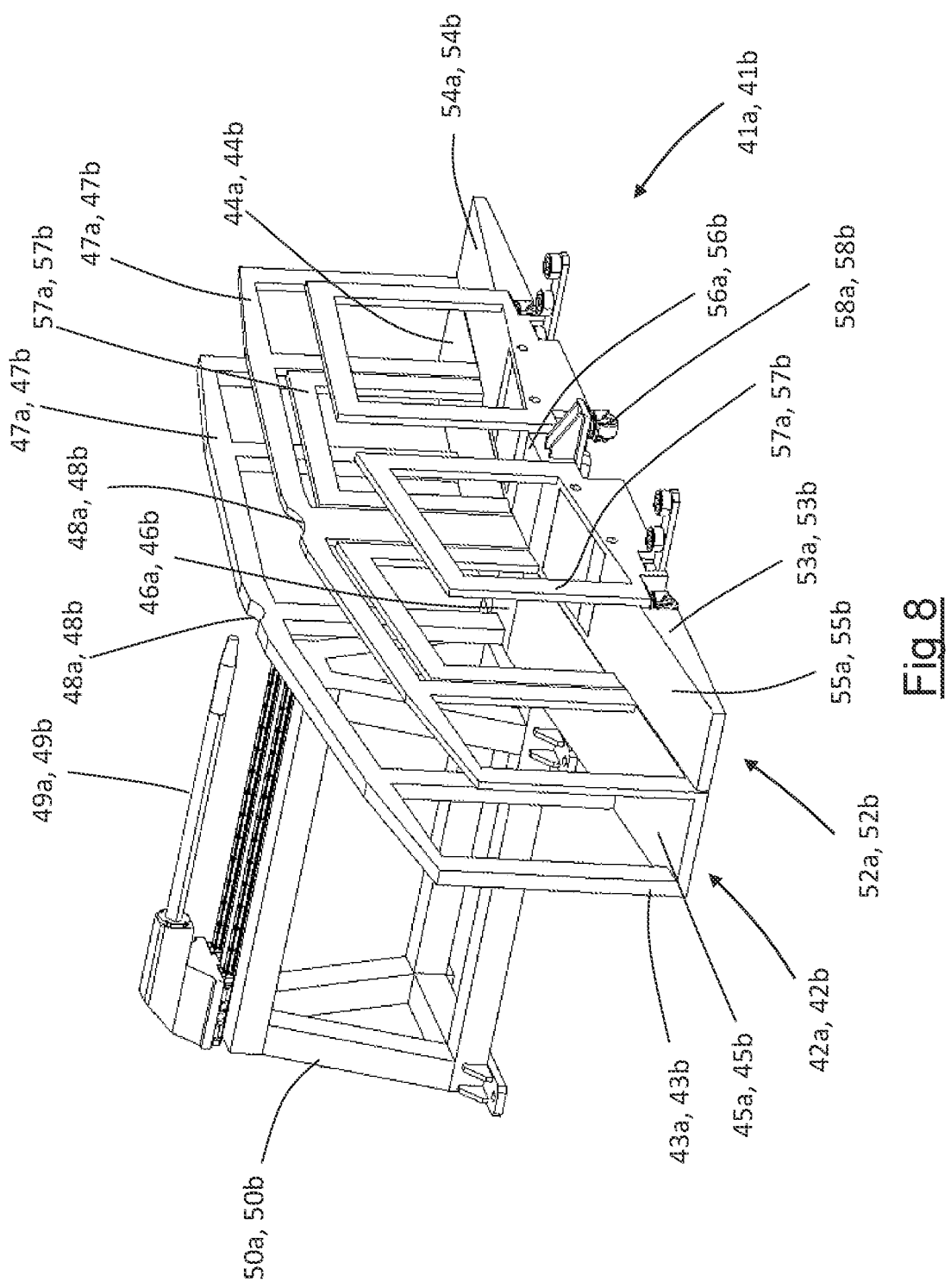
FIG. 8 represents a component of the configuring device of FIGS. 4 to 7.

The configuring device 21 comprises a first configuration structure 41a and a second configuration structure 41b that are identical to each other and represented in FIG. 8.

As shown in FIG. 8, each configuration structure 41a, 41b comprises a first fixed carriage 42a, 42b configured to support a winding support. The first fixed carriage 42a, 42b comprises a loading frame 43a, 43b having a loading ramp 44a, 44b, an unloading ramp 45a, 45b and a positioning pad 46a, 46b arranged between the loading ramp 44a, 44b and the unloading ramp 45a, 45b. The loading ramp 44a, 44b is configured to allow a winding support in the form of a storage bobbin to be made to roll to reach the positioning pad 46a, 46b. The unloading ramp 45a, 45b is configured to allow the winding support in the form of a storage bobbin to be made to roll from the positioning pad 46a, 46b away from the loading frame 43a, 43b. The loading frame 43a, 43b also comprises a pair of containment boards 47a, 47b that delimit a loading path of the winding support in the form of a storage bobbin on the loading frame 43a, 43b. The containment boards 47a, 47b are arranged at opposite ends of the loading ramp 44a, 44b, of the positioning pad 46a, 46b and of the unloading ramp 45a, 45b. The distance that separates the two containment boards 47a, 47b is substantially equal to or slightly greater than the width in the axial direction of a storage bobbin. The height of the containment boards 47a, 47b is slightly greater than half the size in the radial direction of a storage bobbin, in other words slightly greater than the radius of a storage bobbin. At the positioning pad 46a, 46b the two containment boards 47a, 47b comprise a recess 48a, 48b for housing the storage bobbin so that it does not move during the separation step. A holding pin 49a, 49b is slidably mounted on an auxiliary frame 50a, 50b and moves away from and towards the loading frame 43a, 43b. The holding pin 49a, 49b is arranged perpendicular to the containment boards 47a, 47b.

Each configuration structure 41a, 41b also comprises a first movable carriage 52a, 52b configured to support a winding support. The first movable carriage 52a, 52b comprises a loading frame 53a, 53b having a loading ramp 54a, 54b, an unloading ramp 55a, 55b and a positioning pad 56a, 56b arranged between the loading ramp 54a, 54b and the unloading ramp 55a, 55b. The loading ramp 54a, 54b is configured to allow a winding support in the form of a storage bobbin to be made to roll to reach the positioning pad 56a. The unloading ramp 55a, 55b is configured to allow a winding support in the form of a storage bobbin to be made to roll from the positioning pad 56a, 56b away from the loading frame 53a, 53b. The loading frame 53a, 53b also comprises a pair of containment boards 57a, 57b that delimit a loading path of the winding support in the form of a storage bobbin on the loading frame 53a, 53b. The containment boards 57a, 57b are arranged at opposite ends of the loading ramp 54a, 54b, of the positioning pad 56a, 56b and of the unloading ramp 55a, 55b. The distance that separates the two containment boards 57a, 57b is substantially equal to or slightly greater than the width in the axial direction of a storage bobbin. The height of the containment boards 57a, 57b is slightly less than half the size in the radial direction of a storage bobbin, in other words slightly less than the radius of a storage bobbin. The first movable carriage 52a, 52b also comprises a plurality of wheels 58a, 58b to be able to move with respect to the first fixed carriage 42a, 42b. Alternatively, the first movable carriage 52a, 52b can be moved by using a forklift or a pallet truck.

Figure 4:
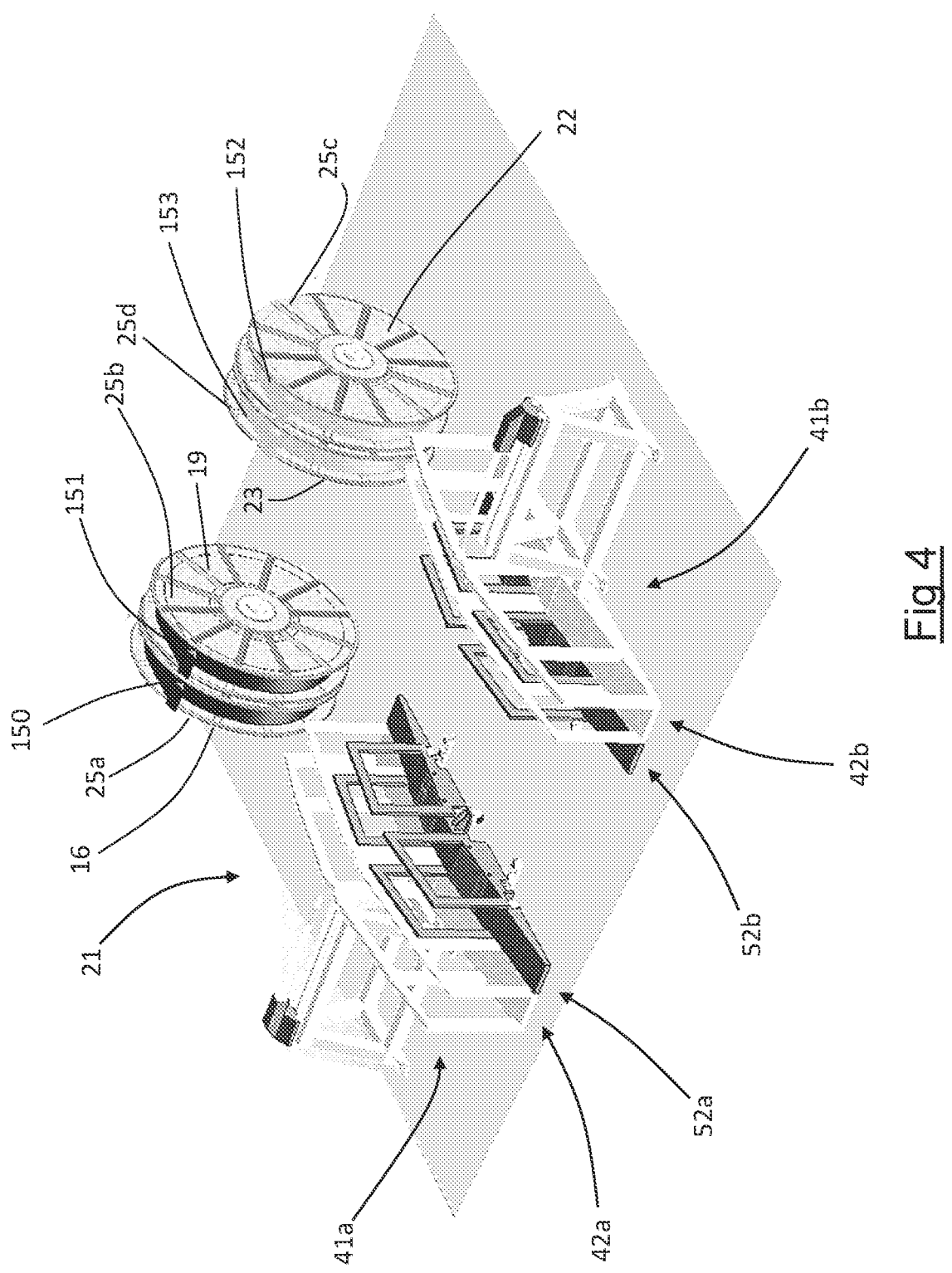
FIGS. 4 to 7 represent a configuring device of the plant of FIG. 1 in different operating conditions.

At the configuring device 21, the first winding support 16 and the second winding support 19 connected together by the first connection device 400a are brought towards the first configuration structure 41a and the third winding support 22 and the fourth winding support 23 connected together by the second connection device 400b are brought towards the second configuration structure 41b (as represented in FIG. 4).

The first winding support 16 and the second winding support 19 are simultaneously loaded respectively on the first fixed carriage 42a and on the first movable carriage 52a. The first movable carriage 52a is located in a first position in which it is beside the first fixed carriage 42a. The first storage bobbin 25a is thus made to roll or slide on the loading ramp 44a of the first fixed carriage 42a (between the two containment boards 47a) until the positioning pad 46a is reached and the second storage bobbin 25b is made to roll or slide on the loading ramp 54a of the first movable carriage 52a (between the two containment boards 57a) until the positioning pad 56a is reached. Once the positioning pads 46a, 56a have been reached, the holding pin 49a is translated and inserted into a cavity of the first coupling device 400a to lock and support the first storage bobbin 25a and the second storage bobbin 25b in the position reached.

At this point, the second storage bobbin 25b is decoupled from the first coupling device 400a.

Figure 5:
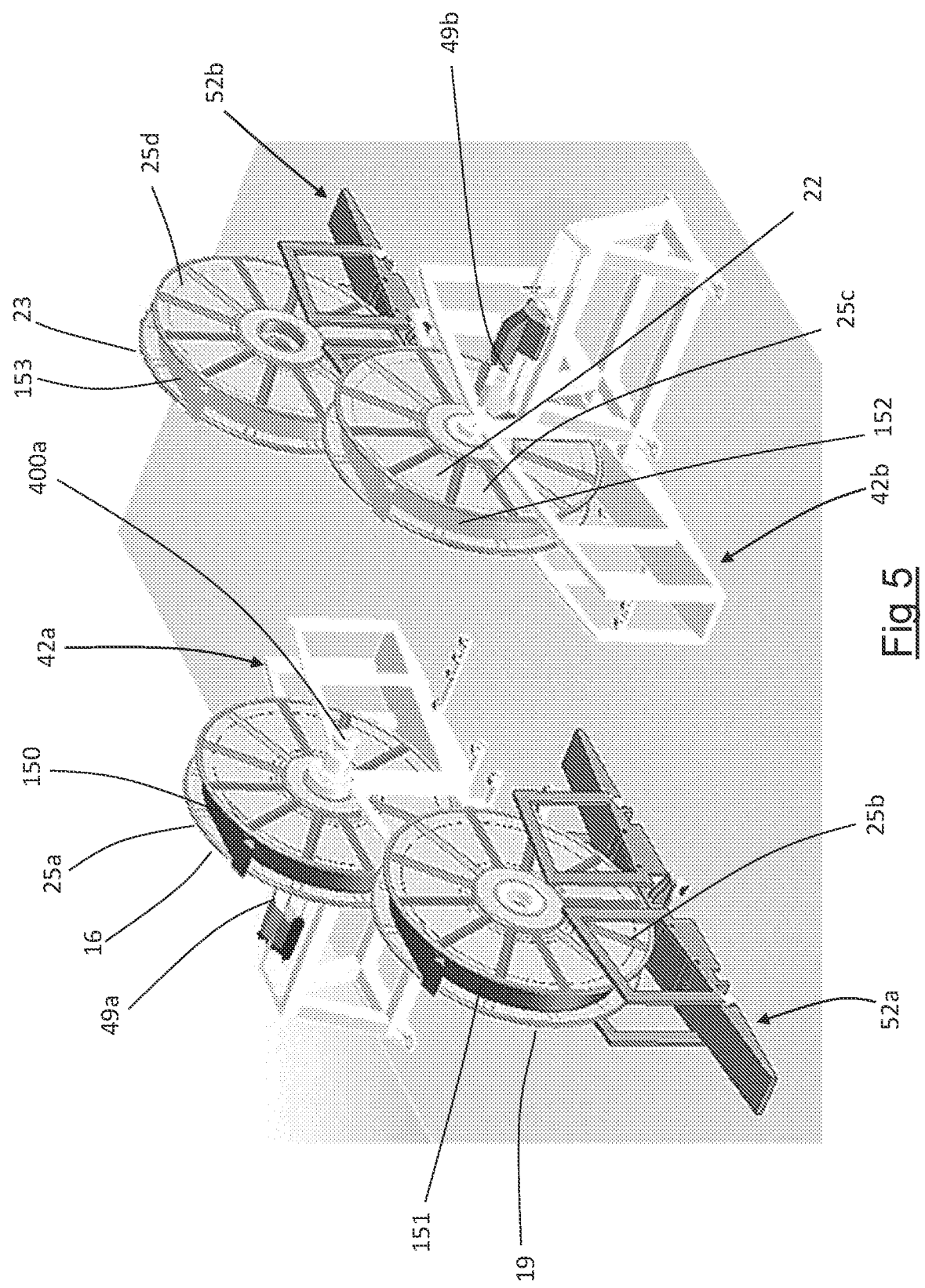

The first movable carriage 52a is translated with respect to the first fixed carriage 42a in a direction parallel to the rotation axis of the first coupling device 400a and to the axis of extension of the holding pin 49a. The first movable carriage 52a is thus taken away (by further translating it) from the first fixed carriage 42a reaching a second position (illustrated in FIG. 5). In this second position, the first storage bobbin 25a is arranged on the first fixed carriage 42a and the second storage bobbin 25b is arranged on the first movable carriage 52a.

Thereafter, simultaneously or beforehand, the third winding support 22 and the fourth winding support 23 are simultaneously loaded respectively on the second fixed carriage 42b and on the second movable carriage 52b. The second movable carriage 52b is located in a first position in which it is beside the second fixed carriage 42b. The third storage bobbin 25c is thus made to roll or slide on the loading ramp 44b of the second fixed carriage 42b (between the two containment boards 47b) until the positioning pad 46b is reached and the fourth storage bobbin 25d is made to roll or slide on the loading ramp 54b of the second movable carriage 52b (between the two containment boards 57b) until the positioning pad 56b is reached. Once the positioning pads 46*b*, 56*b* have been reached, the holding pin 49*b* is translated and inserted into a cavity of the second coupling device 400*b* to lock and support the third storage bobbin 25*c* and the fourth storage bobbin 25*d* in the position reached.

At this point, the fourth storage bobbin 25*d* is decoupled from the second coupling device 400*b*.

The second movable carriage 52*b* is translated with respect to the second fixed carriage 42*b* in a direction parallel to the rotation axis of the second coupling device 400*b* and to the axis of extension of the holding pin 49*b*. The second movable carriage 52*b* is thus taken away (by further translating it) from the second fixed carriage 42*b* reaching a second position (illustrated in FIG. 5). In this second position, the third storage bobbin 25*c* is arranged on the second fixed carriage 42*b* and the fourth storage bobbin 25*d* is arranged on the second movable carriage 52*b*.

Figure 6:
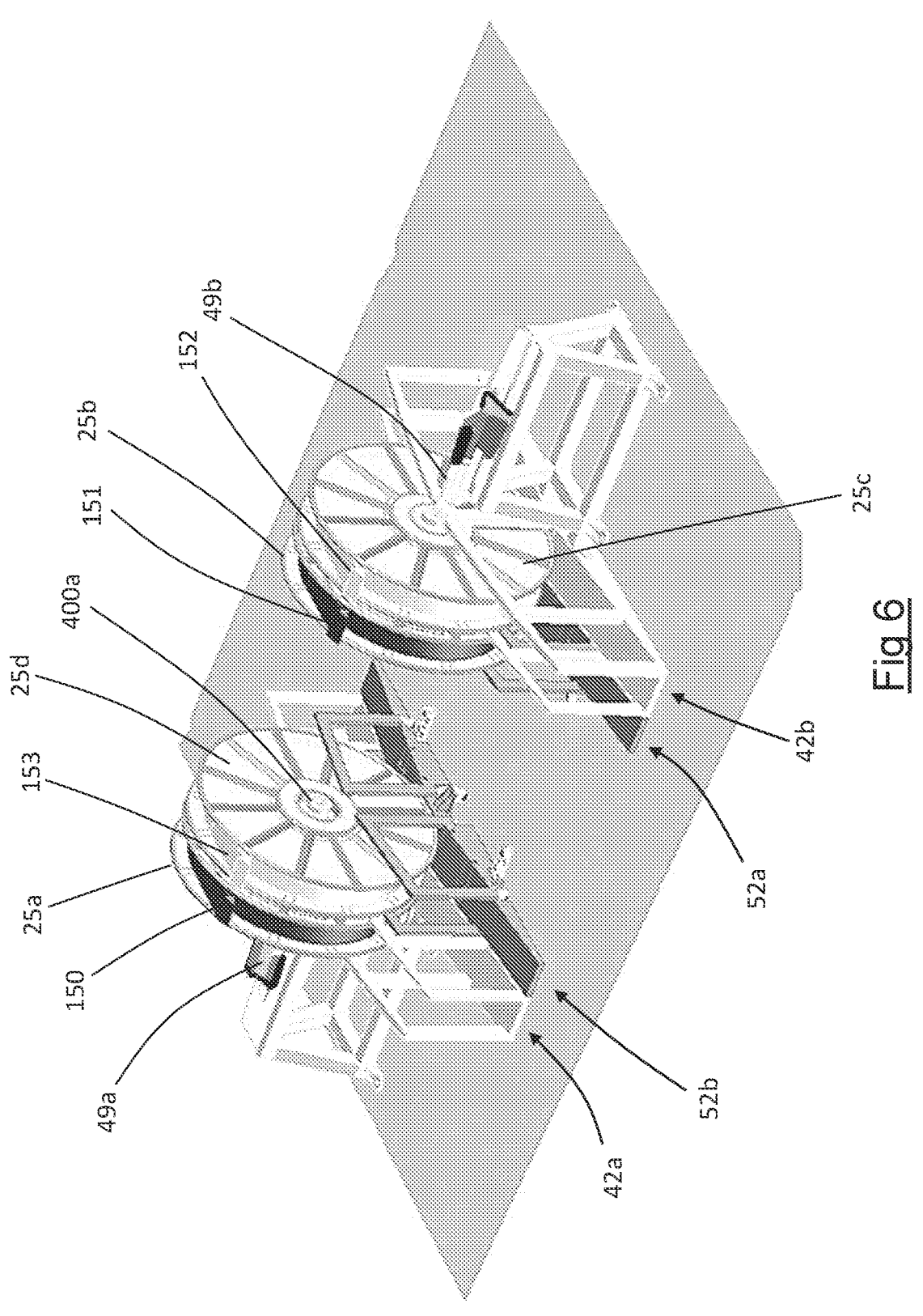

At this point, the first movable carriage 52*a* is moved towards the second fixed carriage 42*b* until a respective third position is reached in which the second storage bobbin 25*b* is axially aligned with the third storage bobbin 25*c*. Once such an alignment is reached, the first movable carriage 52*a* is translated with respect to the second fixed carriage 42*b* in a direction parallel to the rotation axis of the second coupling device 400*b* until the complete insertion of the second storage bobbin 25*b* on the second coupling device 400*b* (as shown in FIG. 6). At this point the second storage bobbin 25*b* is stably connected to the second connection device 400*b* and thus to the third storage bobbin 25*c*.

Thereafter, simultaneously or beforehand, the second movable carriage 52*b* is moved towards the first fixed carriage 42*a* until a respective third position is reached in which the fourth storage bobbin 25*d* is axially aligned with the first storage bobbin 25*a*. Once such an alignment is reached, the second movable carriage 52*b* is translated with respect to the first fixed carriage 42*a* in a direction parallel to the rotation axis of the first coupling device 400*a* until the complete insertion of the fourth storage bobbin 25*d* on the first coupling device 400*a* (as shown in FIG. 6). At this point the fourth storage bobbin 25*d* is stably connected to the first connection device 400*a* and thus to the first storage bobbin 25*a*.

Figure 7:
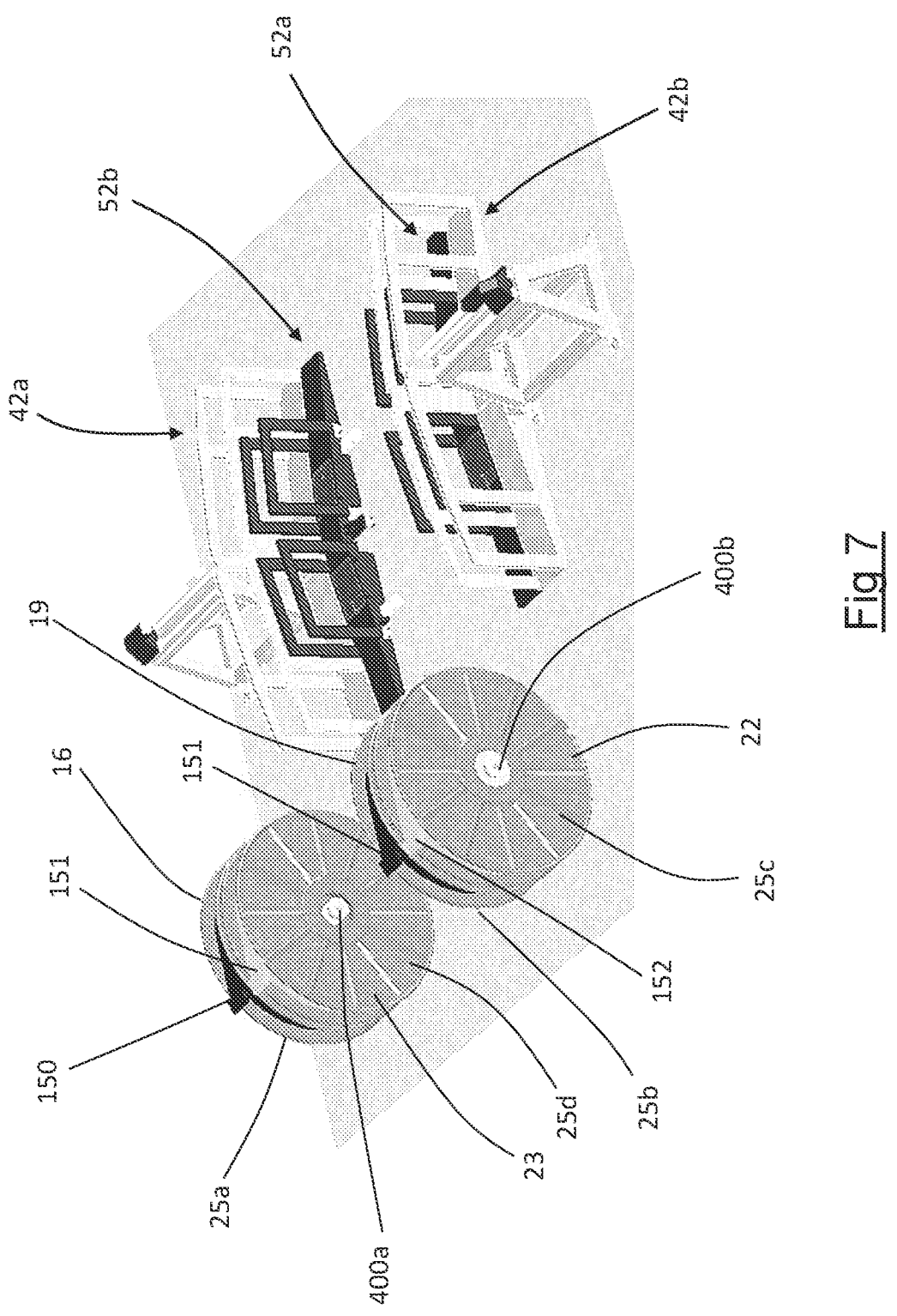

The holding pin 49*a* of the first configuration structure 41*a* is axially translating, freeing it from the engagement with the first coupling device 400*a*. The first storage bobbin 25*a* coupled with the fourth storage bobbin 25*d* is moved away from the first fixed carriage 42*a* making it roll or slide on the unloading ramp 45*a* (between the two containment boards 47*a*). Simultaneously, the fourth storage bobbin 25*d* coupled with the first storage bobbin 25*a* is moved away from the second movable carriage 52*b* making it roll or slide on the unloading ramp 55*b* (between the two containment boards 57*b*), as represented in FIG. 7.

Thereafter, simultaneously or beforehand, the holding pin 49*b* of the second configuration structure 41*b* is axially translated, freeing it from the engagement with the second coupling device 400*b*. The third storage bobbin 25*c* coupled with the second storage bobbin 25*b* is moved away from the second fixed carriage 42*b* making it roll or slide on the unloading ramp 45*b* (between the two containment boards 47*b*). Simultaneously, the second storage bobbin 25*b* coupled with the third storage bobbin 25*c* is moved away from the first movable carriage 52*a* making it roll or slide on the unloading ramp 55*a* (between the two containment boards 57*a*), as represented in FIG. 7.

The plant 10 also comprises a further storage 251.

The further storage 251 is configured to temporarily house the first winding support 16 coupled with the fourth winding support 23 (or a plurality of first winding supports coupled with respective pluralities of fourth winding supports) and the second winding support 19 coupled with the third winding support 22 (or a plurality of second winding supports coupled with respective pluralities of third winding supports). The first winding support 16 and the fourth winding support 23 coupled with it are transferred from the configuring device 21 to the further storage 251. Similarly, the second winding support 19 and the third winding support 22 coupled with it are transferred from the configuring device 21 to the further storage 251.

The further storage 251 and the storage 250 can physically coincide or can be two storages that are physically distinct from each other.

The plant 10 also comprises an unwinding station 60 (illustrated in FIG. 3) configured to simultaneously unwind the first elongated element 150 and the fourth elongated element 153 from the first winding support 16 and from the fourth winding support 23 and/or to unwind the second elongated element 151 and the third elongated element 152 from the second winding support 19 and from the third winding support 22.

The first winding support 16 and the fourth winding support 23 are transferred to the unwinding station 60 from the further storage 251. Alternatively, the first winding support 16 and the fourth winding support 23 are transferred to the unwinding station 60 directly from the configuring device 21.

The unwinding station 60 operates on the first winding support 16 and on the fourth winding support 23 to simultaneously unwind the first elongated element 150 and the fourth elongated element 153 and decouple the first service fabric 200 from the first elongated element 150 and the fourth service fabric 203 from the fourth elongated element 153. The unwinding station 60 can also operate, alternatively, on the second winding support 19 and on the third winding support 22 to simultaneously unwind the second elongated element 151 and the third elongated element 152 and decouple the second service fabric 201 from the second elongated element 151 and the third service fabric 202 from the third elongated element 152.

When the unwinding station 60 operates on the first winding support 16 and on the fourth winding support 23, the first winding support 16 and the fourth winding support 23 can be mounted and dismounted on a frame 61 and can be rotated about a rotation axis X3*a*. On the frame 61 it is also possible to mount and dismount a first collecting winding support 70 able to rotate about a respective rotation axis X4*a*.

The first collecting winding support 70 is configured to wind the first service fabric 200 and the fourth service fabric 203. The first service fabric 200 and the fourth service fabric 203 are fed to the first collecting winding support 70 from a decoupling roller 62 at which the first service fabric 200 and the fourth service fabric 203 are decoupled from the base surface 150*a* of the first elongated element 150 and from the base surface 153*a* of the fourth elongated element 153.

This activity can be carried out by motorizing the rotation axis X4*a* of the first collecting winding support 70 and leaving the coupling roller 62 idle. The rotation axis X3*a* of the first winding support 16 and of the fourth winding support 23 can be idle or preferably slightly braked. Alternatively, both the rotation axis X4*a* of the first collecting winding support 70 and the decoupling roller 62 can be motorized and the rotation axis X3*a* of the first winding support 16 and of the fourth winding support 23 can be idle or preferably slightly braked. In any case, the unwinding of the first elongated element 150 and of the fourth elongated element 153 from the first winding support 16 and from the fourth winding support 23 is carried out by exerting a pulling or traction action on the first service fabric 200 and on the fourth service fabric 203 by the first collecting winding support 70.

When the unwinding station 60 operates on the second winding support 19 and on the third winding support 22, the second winding support 19 and the third winding support 22 can be mounted and dismounted on the frame 61 and can be rotated about a rotation axis X3$b$. On the frame 61 it is also possible to mount and dismount a second collecting winding support 71 able to rotate about a respective rotation axis X4$b$.

The second collecting winding support 71 is configured to wind the second service fabric 201 and the third service fabric 202. The second service fabric 201 and the third service fabric 202 are fed to the second collecting winding support 71 from the decoupling roller 62 at which the second service fabric 201 and the third service fabric 202 are decoupled from the base surface 151$a$ of the second elongated element 151 and from the base surface 152$a$ of the third elongated element 152.

This activity can be carried out by motorizing the rotation axis X4$b$ of the second collecting winding support 71 and leaving the coupling roller 62 idle. The rotation axis X3$b$ of the second winding support 19 and of the third winding support 22 can be idle or preferably slightly braked. Alternatively, both the rotation axis X4$b$ of the second collecting winding support 71 and the decoupling roller 62 can be motorized and the rotation axis X3$b$ of the second winding support 19 and of the third winding support 22 can be idle or preferably slightly braked. In any case, the unwinding of the second elongated element 151 and of the third elongated element 152 from the second winding support 19 and from the third winding support 22 is carried out by exerting a pulling or traction action on the second service fabric 201 and on the third service fabric 202 by the second collecting winding support 71.

The first collecting winding support 70 and the second collecting winding support 71 are shown in FIG. 11.

Each collecting winding support 70, 71 comprises a first collecting storage bobbin 72, 74 and a second collecting storage bobbin 73, 75.

Each collecting storage bobbin 72, 74, 73, 75 comprises a winding surface 76$a$, 76$b$ 77$a$, 77$b$ sized to wind a respective service fabric in coils. The winding surface 76$a$, 76$b$, 77$a$, 77$b$ is axially delimited by a first annular body 78$a$, 78$b$, 80$a$, 80$b$ and by a second annular body 79$a$, 79$b$, 81$a$, 81$b$. The winding surfaces 76$a$, 76$b$, 77$a$, 77$b$ are substantially cylindrical and extend around respective through cavities 82$a$, 82$b$ able to be crossed by a coupling device 400$a$, 400$b$ configured to structurally couple the first collecting storage bobbin 72, 74 and the second collecting storage bobbin 73, 75 and make them rotatable, possibly independently from one another, about said rotation axis X4$a$, X4$b$.

The plant 10 comprises a building line 90 in which at least one forming drum 91 is arranged. The forming drum 91 is operatively associated with the unwinding station 60 to simultaneously receive the two elongated elements that are simultaneously unwound from two winding supports.

In the case in which the first elongated element 150 and the fourth elongated element 153 are unwound simultaneously from the first winding support 16 and from the fourth winding support 23, the first elongated element 150 and the fourth elongated element 153 are deposited simultaneously on the forming drum 91.

In the case in which the second elongated element 151 and the third elongated element 152 are unwound simultaneously from the second winding support 19 and from the third winding support 22, the second elongated element 151 and the third elongated element 152 are deposited simultaneously on the forming drum 91.

Figures 14A, 14B:
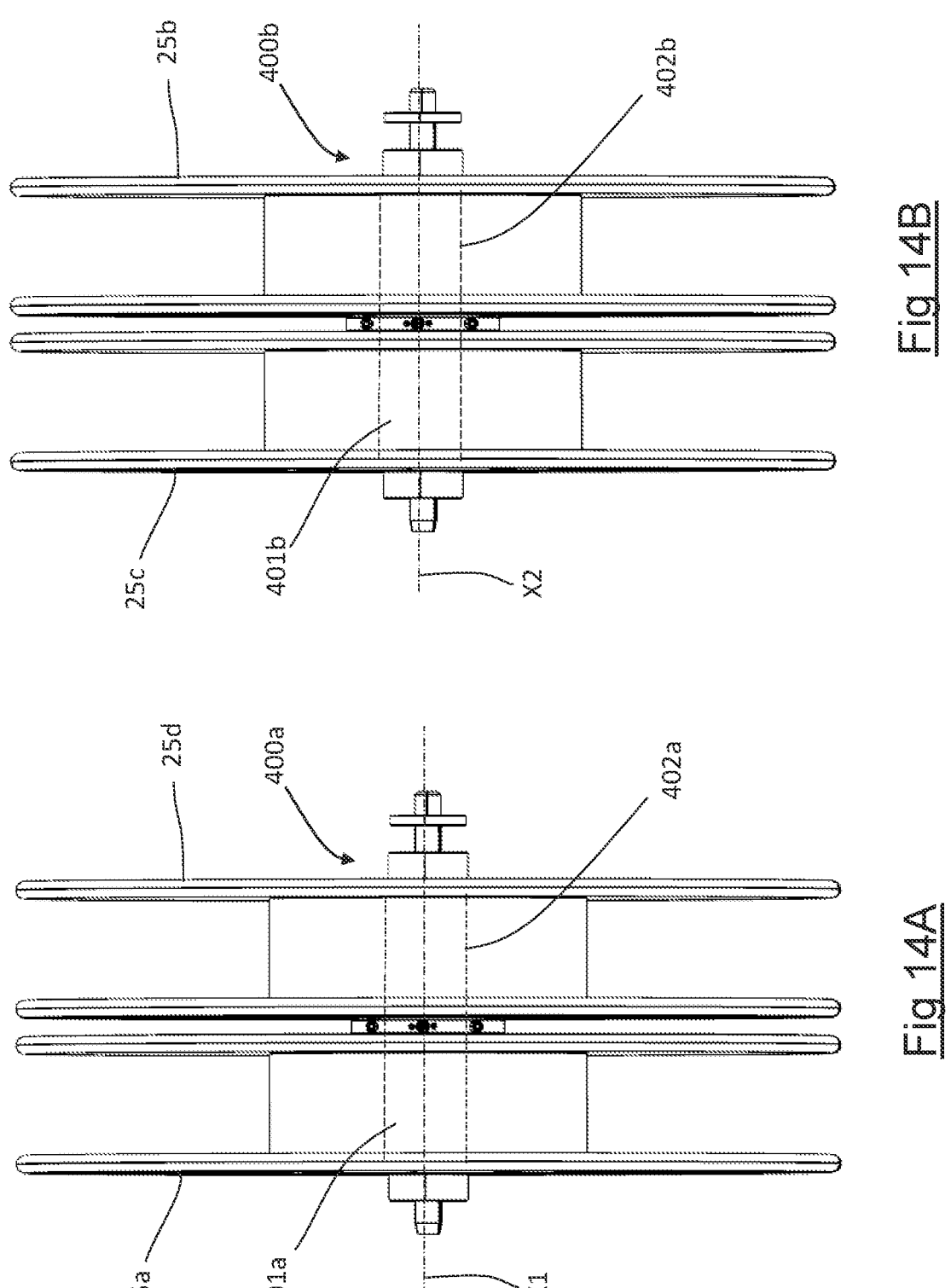
FIGS. 14A and 14B are schematic side views of a coupling device used in the plant of FIG. 1 and in the method for arranging elongated elements in accordance with the present invention.

FIG. 14A represents the first storage bobbin 25$a$ and the fourth storage bobbin 25$d$ coupled with the first coupling device 400$a$. FIG. 14B represents the third storage bobbin 25$c$ and the second storage bobbin 25$b$ coupled with the second coupling device 400$b$. The first coupling device 400$a$ is identical to the second coupling device 400$b$.

The first coupling device 400$a$ and the second coupling device 400$b$ comprise a first coupling portion 401$a$, 401$b$ and a second coupling portion 402$a$, 402$b$ able to rotate about a rotation axis X1, X2. In an unlocked condition, the first coupling portion 401$a$, 401$b$ is rotatable about the rotation axis X1, X2 with respect to the second coupling portion 402$a$, 402$b$. In a locked condition, the first coupling portion 401$a$, 401$b$ rotates as a unit with the second coupling portion 402$a$, 402$b$ about the rotation axis X1, X2.

The first coupling portion 401$a$, 401$b$ is connected to the first storage bobbin 25$a$ or the third storage bobbin 25$c$ so that the first coupling portion 401$a$, 401$b$ and the first storage bobbin 25$a$ or the third storage bobbin 25$c$ rotate together. The second coupling portion 402$a$, 402$b$ is connected to the second storage bobbin 25$b$ or the fourth storage bobbin 25$d$ so that the second coupling portion 402$a$, 402$b$ and the second storage bobbin 25$b$ or the fourth storage bobbin 25$d$ rotate together.

The configuration that provides for the unlocked condition of the first coupling portion 401$a$, 401$b$ allows to simultaneously unwind two elongated elements having winding diameters that are different from each other, each of which is wound on a respective storage bobbin.

The configuration that provides for the locked condition of the first coupling portion allows to simultaneously unwind two elongated elements having winding diameters that are the same as each other, each of which is wound on a respective storage bobbin.

This configuration can be replaced by a configuration in which the first storage bobbin 25$a$ (or the third storage bobbin 25$c$) and the fourth storage bobbin 25$d$ (or the second storage bobbin 25$b$) are joined together by a single rigid shaft (not illustrated).

The present invention has been described with reference to some preferred embodiments. Different modifications can be made to the embodiments described above, whilst still being encompassed by the scope of protection of the invention, defined by the following claims.

The invention claimed is:

1. A method for arranging elongated elements to be used in a process for building tyres for vehicle wheels, comprising:

winding in parallel a first elongated element and a second elongated element of a first type, respectively on a first winding support and on a second winding support coupled and rotatable about a first rotation axis, wherein the first elongated element and the second elongated element are the same as each other;

winding in parallel a third elongated element and a fourth elongated element of a second type, respectively on a third winding support and a fourth winding support coupled and rotatable about a second rotation axis, wherein the third elongated element and the fourth elongated element are the same as each other and are different from the first elongated element and the second elongated element;

decoupling the second winding support from the first winding support and the fourth winding support from the third winding support; and coupling the second winding support with the third winding support and the fourth winding support with the first winding support.

2. The method according to claim 1, wherein winding in parallel the first elongated element and the second elongated element, respectively on the first winding support and on the second winding support, is preceded by mounting the first winding support and the second winding support on a first coupling device.

3. The method according to claim 2, wherein winding in parallel the third elongated element and the fourth elongated element, respectively on the third winding support and on the fourth winding support, is preceded by mounting the third winding support and the fourth winding support on a second coupling device.

4. The method according to claim 3, wherein decoupling the second winding support from the first winding support comprises dismounting the second winding support from the first coupling device and leaving the first winding support mounted on the first coupling device.

5. The method according to claim 4, wherein dismounting the second winding support from the first coupling device comprises associating the second winding support with a first movable carriage and moving the first movable carriage, with the associated second winding support, away from the first coupling device.

6. The method according to claim 5, wherein decoupling the fourth winding support from the third winding support comprises dismounting the fourth winding support from the second coupling device and leaving the third winding support mounted on the second coupling device.

7. The method according to claim 6, wherein dismounting the fourth winding support from the second coupling device comprises associating the fourth winding support with a second movable carriage and moving the second movable carriage, with the associated fourth winding support, away from the second coupling device.

8. The method according to claim 7, wherein coupling the fourth winding support with the first winding support comprises mounting the fourth winding support on the first coupling device.

9. The method according to claim 8, wherein mounting the fourth winding support on the first coupling device comprises moving the second movable carriage with the associated fourth winding support towards the first coupling device.

10. The method according to claim 9, wherein coupling the second winding support with the third winding support comprises mounting the second winding support on the second coupling device.

11. The method according to claim 10, wherein mounting the second winding support on the second coupling device comprises moving the first movable carriage with the associated second winding support towards the second coupling device.

12. The method according to claim 11, wherein winding in parallel the first elongated element on the first winding support and the second elongated element on the second winding support comprises winding the first elongated element on a first storage bobbin and winding the second elongated element on a second storage bobbin.

13. The method according to claim 12, wherein winding in parallel the third elongated element on the third winding support and the fourth elongated element on the fourth winding support comprises winding the third elongated element on a third storage bobbin and winding the fourth elongated element on a fourth storage bobbin.

14. The method according to claim 13, wherein winding in parallel the first elongated element and the second elongated element comprises associating a first service fabric with the first elongated element and a second service fabric with the second elongated element.

15. The method according to claim 14, wherein winding in parallel the third elongated element and the fourth elongated element comprises associating a third service fabric with the third elongated element and a fourth service fabric with the fourth elongated element.

16. The method according to claim 15, wherein said first service fabric and said second service fabric comprise respective resting surfaces and respective two axial end shoulders, wherein associating the first service fabric with the first elongated element and the second service fabric with the second elongated element comprises associating the first elongated element with the resting surface of the first service fabric between said two axial end shoulders and the second elongated element with the resting surface of the second service fabric between said two axial end shoulders, and wherein the two axial end shoulders of the first service fabric and the two axial end shoulders of the second service fabric have equal extension in a radial direction and have greater extension in the radial direction than the extension in the radial direction of the first elongated element and of the second elongated element.

17. The method according to claim 16, wherein said third service fabric and said fourth service fabric comprise respective resting surfaces and respective two axial end shoulders, wherein associating the third service fabric with the third elongated element and the fourth service fabric with the fourth elongated element comprises associating the third elongated element with the resting surface of the third service fabric between said due axial end shoulders and associating the fourth elongated element with the resting surface of the fourth service fabric between said two axial end shoulders, and wherein the two axial end shoulders of the third service fabric and the two axial end shoulders of the fourth service fabric have equal extension in the radial direction and have greater extension in the radial direction than the extension in the radial direction of the third elongated element and of the fourth elongated element.

18. A process for building tyres for vehicle wheels comprising:

a) performing the method according to claim 17, wherein coupling the fourth winding support with the first winding support comprises mounting the first winding support and the fourth winding support on the first coupling device and wherein coupling the second winding support with the third winding support comprises mounting the second winding support and the third winding support on the second coupling device;

b) arranging the first coupling device with the first winding support and the fourth winding support mounted on the first winding support, or arranging the second coupling device with the second winding support and the third winding support mounted on the second winding support, in a building line close to a forming drum;

c1) simultaneously unwinding an elongated element of the first type from the first winding support and an elongated element of the second type from the fourth winding support, or c2) simultaneously unwinding an elongated element of the first type from the second winding support and an elongated element of the second type from the third winding support; and d) simultaneously winding the elongated element of the first type and the elongated element of the second type on the forming drum.

* * * * *